United States Patent
Oshikiri

(10) Patent No.: US 11,037,352 B2
(45) Date of Patent: Jun. 15, 2021

(54) INFORMATION PROCESSING APPARATUS, SYSTEM OF ASSESSING STRUCTURAL OBJECT, METHOD OF ASSESSING STRUCTURAL OBJECT AND STORAGE MEDIUM

(71) Applicant: Ricoh Company, Ltd., Tokyo (JP)

(72) Inventor: Kohji Oshikiri, Kanagawa (JP)

(73) Assignee: RICOH COMPANY, LTD., Tokyo (JP)

(*) Notice: Subject to any disclaimer, the term of this patent is extended or adjusted under 35 U.S.C. 154(b) by 0 days.

(21) Appl. No.: 16/741,744

(22) Filed: Jan. 14, 2020

(65) Prior Publication Data

US 2020/0151931 A1 May 14, 2020

Related U.S. Application Data

(63) Continuation of application No. 16/142,268, filed on Sep. 26, 2018, now Pat. No. 10,565,765.

(30) Foreign Application Priority Data

Sep. 26, 2017 (JP) .............................. JP2017-184380
Sep. 14, 2018 (JP) .............................. JP2018-172365

(51) Int. Cl.
*G06T 11/60* (2006.01)
*G06Q 50/08* (2012.01)
(Continued)

(52) U.S. Cl.
CPC .............. *G06T 11/60* (2013.01); *G06Q 10/20* (2013.01); *G06Q 50/08* (2013.01); *G06T 3/20* (2013.01);
(Continued)

(58) Field of Classification Search
None
See application file for complete search history.

(56) References Cited

U.S. PATENT DOCUMENTS 4,951,227 A    8/1990  Todd
5,986,670 A *  11/1999 Dries ....................... G06T 11/60
                                                    345/629
(Continued)

FOREIGN PATENT DOCUMENTS

CN      104567708 A      4/2015
JP      2002-288180      10/2002
(Continued)

OTHER PUBLICATIONS

Ortner et al. 2016 "Visual Analytics and rendering for tunnel crack analysis" (Year: 2016).*
(Continued)

*Primary Examiner* — Fernando Alcon
(74) *Attorney, Agent, or Firm* — Xsensus LLP

(57) ABSTRACT

An information processing apparatus includes circuitry configured to acquire data of a development-view image of the structural object, display the development-view image of the structural object on a display, receive a drawing of a diagnosis target image indicating a diagnosis target in the development-view image of the structural object, display, on the display, an input screen for inputting assessment-related information including an assessment result of the diagnosis target indicated by the diagnosis target image, and receive an input of the assessment-related information including the assessment result via the input screen.

9 Claims, 40 Drawing Sheets

(51) Int. Cl.
*G06Q 10/00* (2012.01)
*G06T 7/73* (2017.01)
*G06T 3/20* (2006.01)
*G06T 7/00* (2017.01)
*G06T 11/20* (2006.01)
*H04N 5/232* (2006.01)

(52) U.S. Cl.
CPC .............. *G06T 7/0002* (2013.01); *G06T 7/73* (2017.01); *G06T 11/203* (2013.01); *G06T 2207/20104* (2013.01); *G06T 2207/30184* (2013.01); *H04N 5/232* (2013.01)

(56) References Cited

U.S. PATENT DOCUMENTS

| | | | |
|---|---|---|---|
| 9,129,355 | B1 | 9/2015 | Harvey et al. |
| 9,390,489 | B1 | 7/2016 | Harvey et al. |
| 9,805,456 | B1 | 10/2017 | Harvey et al. |
| 10,007,992 | B1 | 6/2018 | Harvey et al. |
| 2006/0227130 | A1 | 10/2006 | Elchuri |
| 2009/0192772 | A1 | 7/2009 | Fukuda et al. |
| 2009/0198539 | A1 | 8/2009 | Buzz |
| 2011/0050888 | A1 | 3/2011 | Shibukawa et al. |
| 2013/0120598 | A1* | 5/2013 | Iwasaki ............ H04N 5/225 348/207.11 |
| 2016/0253816 | A1 | 9/2016 | Niemczyk |
| 2016/0335332 | A1 | 11/2016 | Pimento |
| 2017/0236024 | A1 | 8/2017 | Wang et al. |
| 2017/0308088 | A1 | 10/2017 | Sabe et al. |
| 2018/0357144 | A1* | 12/2018 | Pasanen ............ G06F 11/3013 |
| 2018/0374052 | A1 | 12/2018 | Mogal |
| 2019/0050765 | A1 | 2/2019 | Yabuki |

FOREIGN PATENT DOCUMENTS

| | | |
|---|---|---|
| JP | 2004-347585 A | 12/2004 |
| JP | 2018-116592 | 7/2018 |
| WO | WO 2014/142900 A1 | 9/2014 |
| WO | WO 2016/059785 A1 | 4/2016 |

OTHER PUBLICATIONS

Extended European Search Report dated Nov. 28, 2018 in European Patent Application No. 18196960.1, 12 pages.
Wimsatt A., et al., "Mapping Voids, Debonding, Delaminations, Moisture, and Other Defects Behind or Within Tunnel Linings", The National Academies Press, XP055523909, Oct. 25, 2013, pp. 1-393 with cover pages.
Thomas, O., et al., "Visual analytics and rendering for tunnel crack analysis", Visual Computer, vol. 32 No. 6, XP035982460, May 11, 2016, pp. 859-869.
Spacetec: "Software zur Datenanalyse von Tunnelscans", Retrieved from the Internet URL: https://web.archive.org/web/20160316060802/http://www.spacetec.de/tuview.html, XP055525151, Mar. 16, 2016, 2 pages (with English translation).
Spacetec: "Software zur Tunnelinspektion", Retrieved from the Internet: URL: https://web.archive.org/web/20170331191628/http://www.spacetec.de/tunnel-inspector.html, XP055525154, Mar. 31, 2017, 2 pages(with English translation).
Anonymous, "High-Speed Nondestructive Testing Methods for Mapping Voids, Debonding, Delaminations, Moisture, and Other Defects Behind or Within Tunnel Linings", IBTTA Facilities Management and Maintenance Workshop, Nashville, Retrieved from the Internet: URL: https://www.ibtta.org/sites/default/files/documents/2011/Nashville/Wimsatt_Andrew.pdf, XP055523622, Oct. 31, 2011, 88 pages.
Wiesler, A., "Thermografie in Tunnelbauwerken", Fachtagung Bauwerksdiagnose, Retrieved from the Internet: URL: https://www.ndt.net/article/bau-zfp2006/v10.pdf, XP055523724, Feb. 24, 2006, 15 pages (with English abstract).
Tabrizi, K., et al., "Damage Assessment of Tunnel Lining by Mobile Laser Scanning", Implementation Phase of FHWA SHRP 2 R06G Project, Transportation Research Record, XP055523738, vol. 2642 No. 1, Jan. 10, 2017, pp. 166-179.
Geodata: "ORTHOS laser Tunnel Scanner", Retrieved from the Internet: URL: http://www.geodata.at/en/datenblatter_pdf/ORTHOS-Laser-Tunnelscanner-e.pdf, XP055523819, Nov. 4, 2009, pp. 1-9.
Leica Geosystems: "Leica TMS Tunnelscan Complete Tunnel Documentation", Retrieved from the Internet: URL: https://w3.leica-geosystems.com/downloads123/zz/general/tms%20tunnelscan/brochures/leica_tms_tunnelscan_en.pdf, XP055523834, Jun. 16, 2006,8 pages.
Cronvall, T., "Laser Scanning of Railway Tunnels", Retrieved from the Internet: URL: http://www.nvfnorden.org/lisalib/getfile.aspx?itemid=3118, XP055523899, Feb. 4, 2010, 21 pages.
Wikipedia: "Google Glass", Retrieved from the Internet: URL: https://en.wikipedia.org/w/index.php?title=Google_Glass&oldid=801010070, XP055525118, Sep. 17, 2017, pp. 1-17.
European Office Action dated Feb. 3, 2020, issued in corresponding European Patent Application No. 18196960.1, 10 pages.
Ken McMahon—PaintShop Photo Pro X3 for Photographers, COREL, Jun. 29, 2010, 113 pages.
Corel—Corel PaintShop Pro X9 User Guide, Jul. 28, 2016, 361 pages.
C.R. Rao, et al.—Data Mining and Data Visualization—Jun. 21, 2005, 7 pages.
Howtech—How to Work With Polylines in AutoCAD, Nov. 26, 2012, 2 pages.
Notice of Reasons for Refusal dated Mar. 13, 2020 in corresponding Japanese Patent Application No. 2018-172365, with English Translation, 9 pages.
Work plan, management support system [NET version] Field Map Creation Guide, Independent Administrative Agency National Agriculture and Food Research Organization—Nov. 2011.
A method of maintaining and managing a concrete structure using "a crack detection system of a concrete stucture", a "CrackDraw21", a "various data management system (temporary description)", and an introduction of an expanded function—May 7, 2006.

* cited by examiner

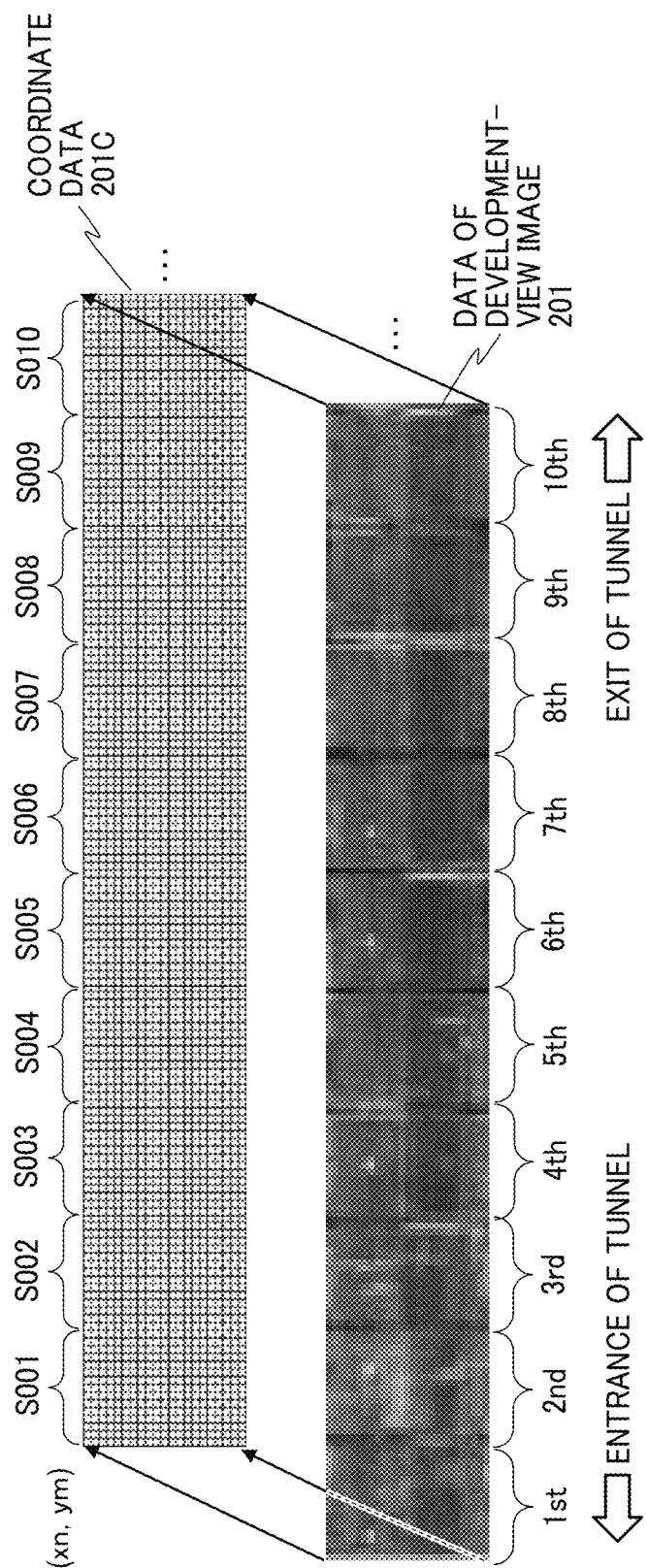

FIG. 5

DIAGNOSIS INFORMATION MANAGEMENT TABLE

| DIAGNOSIS REGION NUMBER | SPAN NUMBER (FORMWORK NUMBER) | COORDINATES WITHIN SPAN OF DIAGNOSTIC REGION | HEIGHT AND WIDTH OF DIAGNOSIS REGION | PHOTO-GRAPH NUMBER | TYPE OF OBSERVED FINDINGS AND ABNORMALITY | EVALUA-TION RESULT | DETAIL INFORMATION |
|---|---|---|---|---|---|---|---|
| 1 | S001 | (x1, y1) | (x100, y100) | 1 | CRACK | S | NEAR COORDINATES (x1, y1), CRACK WIDTH: 0.6 mm, CRACK LENGTH: xxx mm |
| 2 | S001 | (x2, y2) | (x200, y200) | 1 | WATER LEAKAGE | B | NEAR COORDINATES (x2, y2), WIDTH: 100 cm, HEIGHT: 250 cm, WATER LEAKAGE ON WALL |
| 3 | S002 | (x3, y3) | (x300, y300) | 2 | CRACK | C | NEAR COORDINATES (x3, y3), CRACK WIDTH: 3.0 mm, CRACK LENGTH: xxx mm |
| 3 | S002 | (x3, y3) | (x300, y300) | 2 | CALCIFICATION | A | NEAR COORDINATES (x3, y3), CALCIFICATION NEAR CRACK |
| 3 | S002 | (x3, y3) | (x300, y300) | 2 | WATER LEAKAGE | A | NEAR COORDINATES (x3, y3), SOME WATER LEAKAGE NEAR CRACK |
| ... | ... | ... | ... | ... | ... | ... | ... |

FIG. 6

DIAGNOSIS TARGET ELEMENT MANAGEMENT TABLE

| DIAGNOSIS REGION NUMBER | SPAN NUMBER (FORMWORK NUMBER) | ELEMENT NUMBER | COORDINATES OF START POINT OF DIAGNOSIS TARGET ELEMENT IMAGE | COORDINATES OF END POINT OF DIAGNOSIS TARGET ELEMENT IMAGE | WIDTH OF DIAGNOSIS TARGET ELEMENT (mm) |
|---|---|---|---|---|---|
| 1 | S001 | 1 | (x11, y11) | (x12, y12) | 0.3 |
| 1 | S001 | 2 | (x12, y12) | (x13, y13) | 0.5 |
| 1 | S001 | 3 | (x13, y13) | (x14, y14) | 0.6 |
| 2 | S001 | 1 | (x21, y21) | (x22, y22) | – |
| 2 | S001 | 2 | (x22, y22) | (x23, y23) | – |
| 2 | S001 | 3 | (x23, y23) | (x24, y24) | – |
| 2 | S001 | 4 | (x24, y24) | (x25, y25) | – |
| 2 | S001 | 5 | (x25, y25) | (x26, y26) | 2.0 |
| 3 | S002 | 1 | (x31, y31) | (x32, y32) | 2.5 |
| 3 | S002 | 2 | (x32, y32) | (x33, y33) | 3.0 |
| 3 | S002 | 3 | (x33, y33) | (x34, y34) | 2.5 |
| 3 | S002 | 4 | (x34, y34) | (x35, y35) | ... |
| ... | ... | ... | ... | ... | ... |

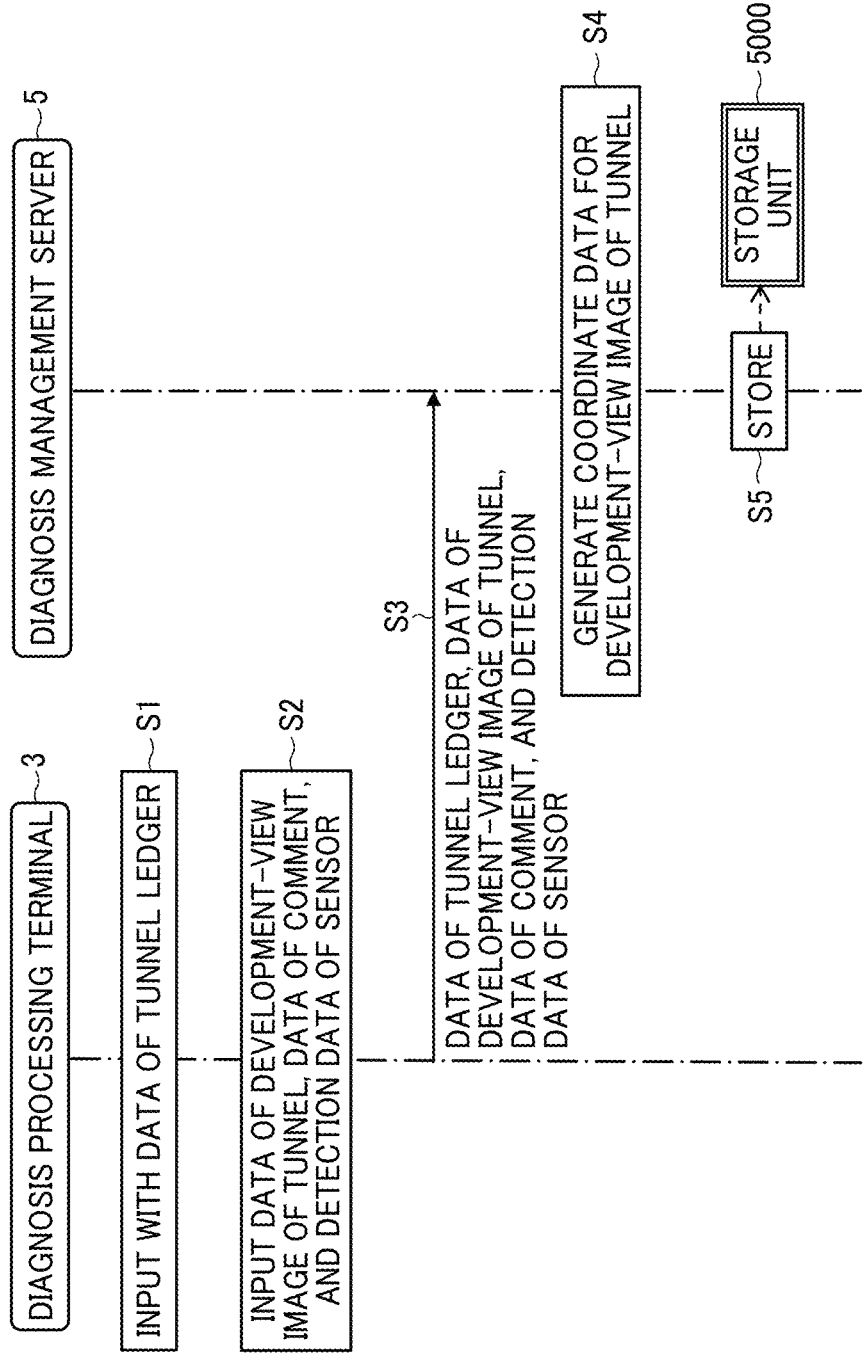

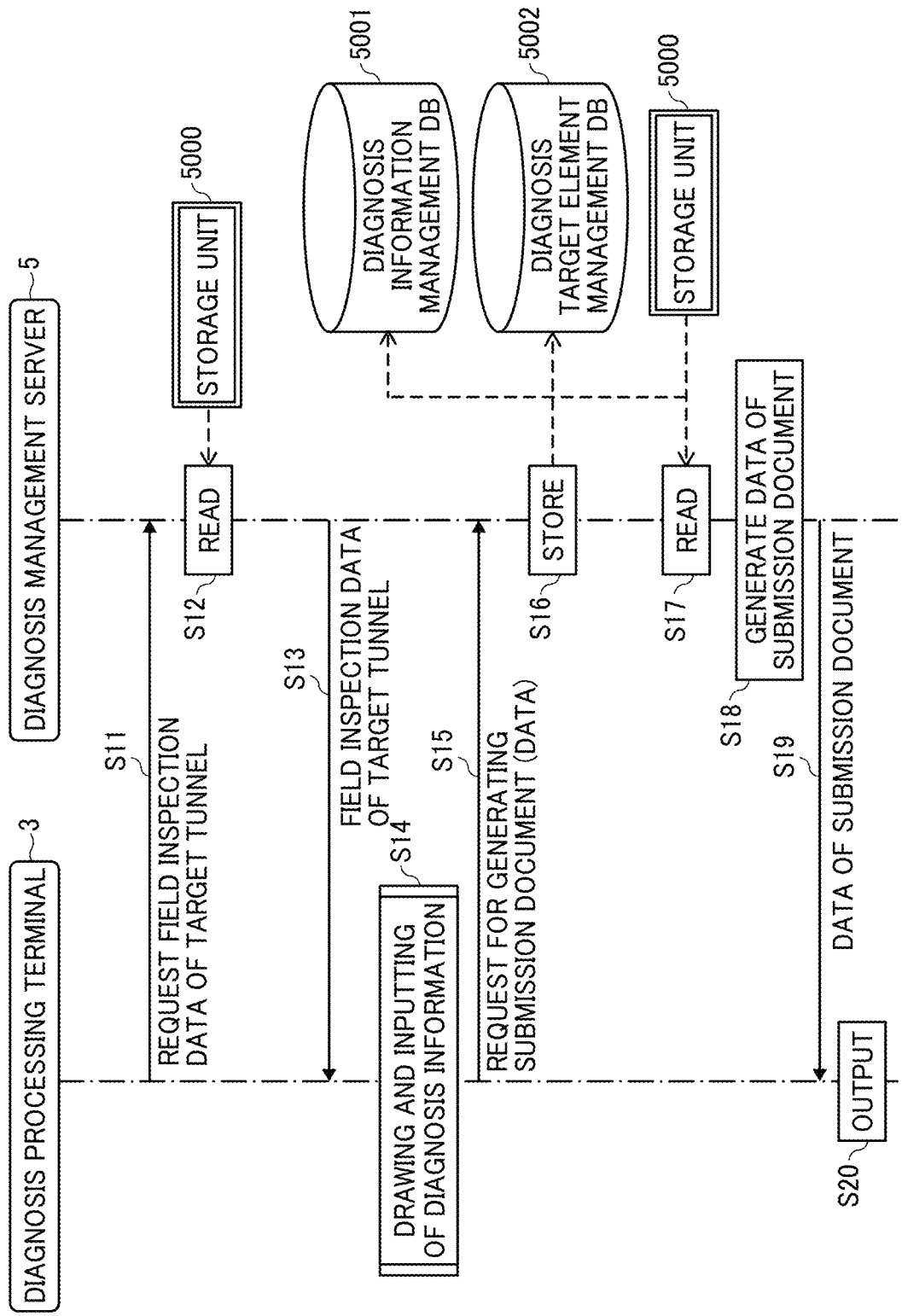

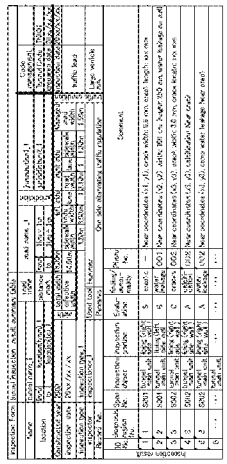

FIG. 9B

| Inspection Form | Tunnel inspection result summary table | | | | | | | | | | | | | |
|---|---|---|---|---|---|---|---|---|---|---|---|---|---|---|
| Name | tunnel name_1 | | | | | | | | | jurisdiction | | Code management office | | |
| | | | | | | | | | | jurisdiction1_1 | | | | |
| location | from | location(from)_1 | | | road name_1 | | | | | jurisdiction2_1 | | Tunnel Code | TN001 | |
| | to | location(to)_1 | | | distance mark | from | 1km + 1m | | | | | Prepared date | 20xx/xx/xx | |
| | | | | | | to | 1km + 1m | | | | | inspection date | 20xx/xx/xx | |
| Constructed year | 2000 | | | | width | total width | 16.00m | left side | | right side | | traffic load | | |
| inspection date | 20xx/xx/xx | | | | | effective width | 14.50m | sidewalk width | rode width | lane | road width | lane width | sidewalk width | |
| inspection type | inspection type_1 | | | | | | | 1.20m | 3.00m | 1 | 13.10m | 1 | 1.30m | |
| inspector | inspector_1 | | | | Used tool | Hammer | | | | | | Managed road width | 1.50m | Large vehicle mix |
| Record No. | | | | | Remarks | | One side alternating traffic regulation | | | | | | | traffic condition |
| ID | diagnosis region No. | Span No. | inspection object | inspection portion | Evaluation | finding/ abnormality | Photo No. | Detail information | | | | | | |
| 1 | 1 | S001 | tunnel main unit | lining (right side wall) | S | cracks | — | Near coordinates (x1, y1), crack width: 0.6 mm, crack length: xxx mm | | | | | | |
| 2 | 2 | S001 | tunnel main unit | lining (left side wall) | B | water leakage | 001 | Near coordinates (x2, y2), width: 100 cm, height: 250 cm, water leakage on wall | | | | | | |
| 3 | 3 | S002 | tunnel main unit | lining (right side wall) | C | cracks | 002 | Near coordinates (x3, y3), crack width: 3.0 mm, crack length: xxx mm | | | | | | |
| 4 | 3 | S002 | tunnel main unit | lining (right side wall) | A | calcification | 002 | Near coordinates (x3, y3), calcification Near crack | | | | | | |
| 5 | 3 | S002 | tunnel main unit | lining (right side wall) | A | water leakage | 002 | Near coordinates (x3, y3), some water leakage Near crack | | | | | | |
| 6 | ... | ... | ... | ... | ... | ... | ... | ... | | | | | | | inspection result

| inspection form | Inspection findings photo ledger | | | | | | | |
|---|---|---|---|---|---|---|---|---|
| Name | Tunnel name_1 | | Road name | Road name_1 | | jurisdiction | jurisdiction1_1 | code management office |
| location | from | location(from)_1 | distance mark | from | 1km + 1m | | jurisdiction2_1 | tunnel code | TN001 |
| | to | location(to)_1 | | to | 1km + 1m | | | prepared date | 20xx/xx/xx |
| Photo No. | 001 | | | | | Photo No. | 003 | |
| Span No. | S001 | | | | | Span No. | | |
| inspection object | tunnel main unit | | | | | inspection object | | |
| inspection portion | lining (left wall) | | | | | inspection portion | | |
| finding/ abnormality | water leakage | | | | | finding/ abnormality | | |
| evaluation | B | | | | | evaluation | | |
| comment | Near coordinates (x, y), width: xxx cm, height: xxx cm, water leakage on wall | | | | | comment | | |
| Photo No. | 002 | | | | | Photo No. | 004 | |
| Span No. | S003 | | | | | Span No. | | |
| inspection object | tunnel main unit | | | | | inspection object | | |
| inspection portion | lining (right wall) | | | | | inspection portion | | |
| finding/ abnormality | cracks, calcification, water leakage | | | | | finding/ abnormality | | |
| evaluation | C | | | | | evaluation | | |
| comment | Near coordinates (x, y), crack width: 0.6 mm, crack length: xxx mm | | | | | comment | | |

FIG. 22

DIAGNOSIS INFORMATION INPUT SCREEN SC4

| COMMENT INPUT/LAYER SELECTION | ☒ |

LINK WITH PREVIOUS INFORMATION: [SELECT] : NOT SELECT
INSPECTION OBJECT : [TUNNEL MAIN UNIT ▼]
INSPECTION PORTION : [ ▼]

| NUMBER | TYPE OF FINDINGS/ ABNORMALITY | EVALUATION | COMMENT |
|---|---|---|---|
| 1 | CRACK ▼ | | |
| 2 | CRACK ▼ | | |
| 3 | CRACK ▼ | | |
| 4 | CRACK ▼ | | |
| 5 | CRACK ▼ | | |

[single]  [CANCEL]  [OK]

INPUT SWITCHING BUTTON "bs"

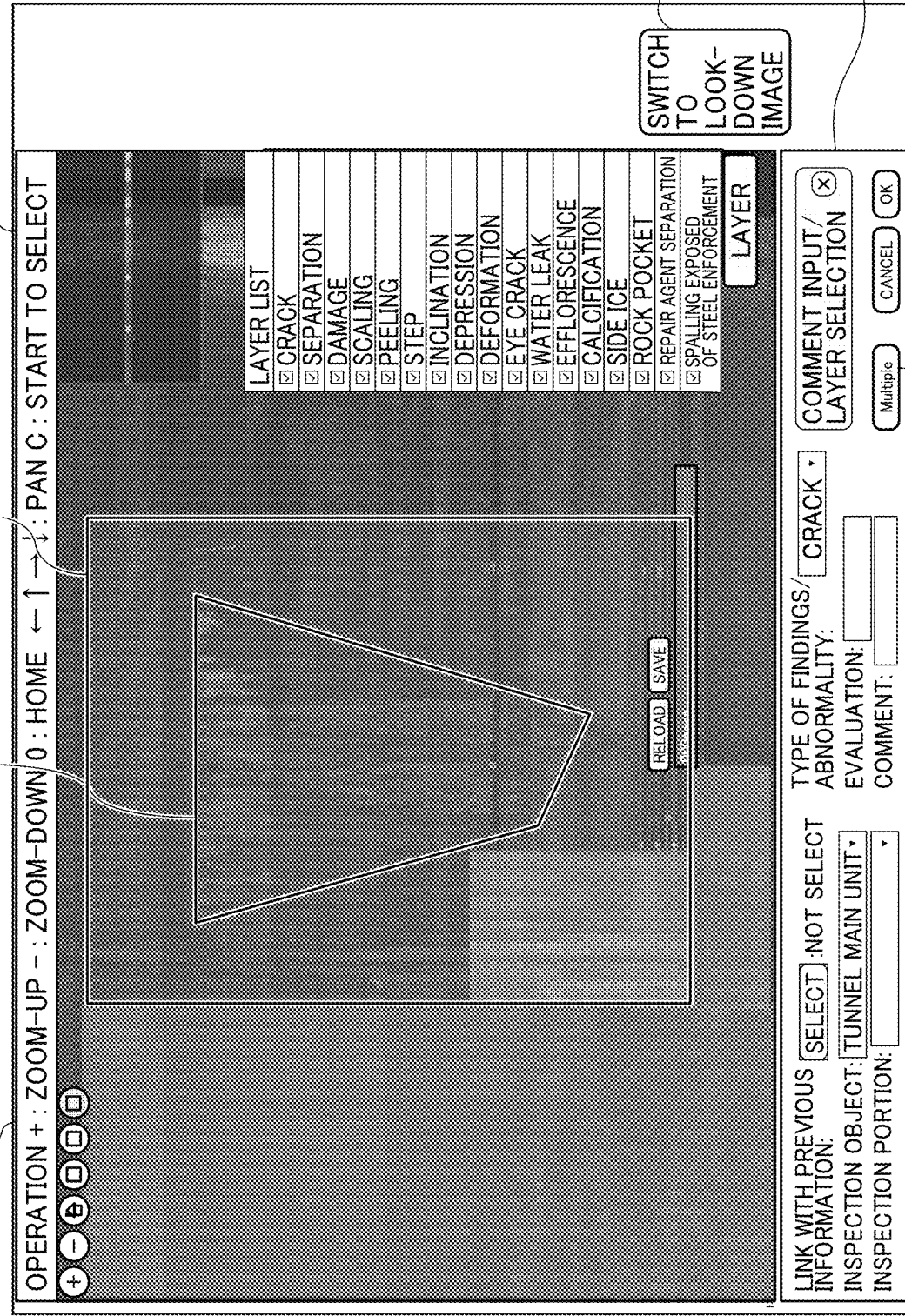

FIG. 37
RELATED ART

INFORMATION PROCESSING APPARATUS, SYSTEM OF ASSESSING STRUCTURAL OBJECT, METHOD OF ASSESSING STRUCTURAL OBJECT AND STORAGE MEDIUM

CROSS-REFERENCE TO RELATED APPLICATION

This application is a continuation of U.S. application Ser. No. 16/142,268, filed Sep. 26, 2018, which claims priority pursuant to 35 U.S.C. § 119(a) to Japanese Patent Application Nos. 2017-184380, filed on Sep. 26, 2017, and 2018-172365, filed on Sep. 14, 2018 in the Japan Patent Office, the disclosure of each is incorporated by reference herein in its entirety.

BACKGROUND

Technical Field

This disclosure relates to an information processing apparatus, a system of assessing a structural object, and a method of assessing a structural object, and a non-transitory computer readable storage medium.

Background Art

Structural objects such as tunnels are covered with lining such as concrete. When concrete properties change over time, cracks or the like can occur. If the aged concrete of a tunnel is not maintained properly, concrete pieces might peel off from a wall of the tunnel, causing damage to vehicles and people on a road. Therefore, under the regulation and instructions of national and local government offices that monitor tunnels, inspection contractors or firms conduct periodic inspections of the tunnels, and reports inspection results of the tunnels to the government offices. The inspection contractors are required to submit inspection reports using a given document format regulated by the national and local governments in some countries.

Hereinafter, a description is given of conventional procedure of acquiring and handling data performed by an inspection contractor with reference to FIG. 37. FIG. 37 illustrates a scheme of conventional inspection processing performed by the inspection contractor.

When the inspection contractor inspects a tunnel, an inspector takes notes of observed conditions of the tunnel on a field inspection book, captures images of changed-portions of the tunnel as changed-portion photographs, and then creates a final inspection report, to be submitted to the national and local government offices, describing tunnel properties (e.g., name, location, length, age) using a tunnel ledger obtained from the government offices. The final inspection report includes, for example, an observed inspection findings chart, a photograph-captured position chart, a photograph ledger, and a tunnel inspection result summary table, as illustrated in FIG. 37, in which the observed inspection findings chart includes the photograph-captured position chart. The inspection findings indicate any kind of findings observed on the tunnel surface, such as potential or imminent abnormalities (e.g., initial defects, aging defects, damages, deformations) that may cause problems, and non-abnormalities portions (e.g., stains) that may not cause problems.

The final inspection report can be created using conventional procedure as illustrated in FIG. 37. (1) The observed inspection findings chart represents drawings of inspection findings (e.g., cracks) observed at portions during the inspection. When the inspection contractor creates the observed inspection findings chart, the inspection contractor refers to various field inspection records, such as the field inspection book, the observed-inspection findings photographs, and the tunnel ledger to draw lines representing the inspection findings (e.g., cracks), and input a width of the lines, such as crack lines using a computer-aided design (CAD) program.

(2) The photograph ledger includes evaluation (assessment) results of the observed-inspection findings, such as cracks, associated with the observed-inspection findings photographs. The inspection contractor manually attaches the observed-inspection findings photographs on the photograph ledger, and inputs diagnosis information including the evaluation results by referring to detail information of the inspection findings recorded on the field inspection book during the inspection. Further, to clarify which portion of the tunnel corresponds to the observed-inspection findings photograph attached to the photograph ledger, the observed inspection findings chart is added with an identification number of the observed-inspection findings photograph attached to the photograph ledger.

(3) The tunnel inspection result summary table includes various information of the tunnel, such as tunnel properties (e.g., tunnel length) and the diagnosis information including the evaluation results. Specifically, the inspection contractor inputs the tunnel properties (e.g., tunnel length) in the tunnel inspection result summary table based on the tunnel ledger, and the diagnosis information including the evaluation results of the observed inspection findings based on the field inspection book.

(4) In order to associate the inspection findings-observed portions related to the evaluation results and the observed-inspection findings photograph attached to the photograph ledger, the inspection contractor inputs an identification number associated with the observed-inspection findings photograph attached to the photograph ledger on the tunnel inspection result summary table.

When creating the final inspection report including various inspection records such as the observed inspection findings chart, the photograph-captured position chart, the photograph ledger, and the tunnel inspection result summary table, the inspection contractor manually selects the detail information of inspection findings and the observed-inspection findings photographs that correspond to positions in the tunnel from a large number of the detail information of inspection findings recorded in the field inspection book and a large number of the observed-inspection findings photographs, in which the inspection contractor might make mistakes in the final inspection report, which might be caused by manual operation of creating the final inspection report. Further, the final inspection report is required to include a common description, such as diagnosis information or the like among various inspection records (e.g., the observed inspection findings chart, the photograph-captured position chart, the photograph ledger, and the tunnel inspection result summary table), and identification numbers to link various inspection records (e.g., the observed inspection findings chart, the photograph-captured position chart, and the photograph ledger) with each other. Therefore, even if only one part of the final inspection report is to be modified or corrected due to some reasons, each document of various inspection records included in the final inspection report is required to be modified or corrected, causing a greater effort and a longer time to create the final inspection report including the diagnosis information of the structural object such as the tunnel.

SUMMARY

In one aspect of the present invention, an information processing apparatus to assess a structural object is devised. The information processing apparatus includes circuitry configured to acquire data of a development-view image of the structural object, display the development-view image of the structural object on a display, receive a drawing of a diagnosis target image indicating a diagnosis target in the development-view image of the structural object, display, on the display, an input screen for inputting assessment-related information including an assessment result of the diagnosis target indicated by the diagnosis target image, and receive an input of the assessment-related information including the assessment result via the input screen.

In another aspect of the present invention, a method of processing information of a structural object is devised. The method includes acquiring data of a development-view image of the structural object, displaying the development-view image of the structural object on a display, receiving a drawing of a diagnosis target image indicating a diagnosis target in the development-view image of the structural object, displaying, on the display, an input screen for inputting assessment-related information including an assessment result of the diagnosis target indicated by the diagnosis target image, receiving an input of the assessment-related information including the assessment result via the input screen, and storing, in a memory, coordinates of the diagnosis target image and the received assessment-related information in association with each other.

In another aspect of the present invention, a non-transitory computer readable storage medium storing one or more instructions that, when executed by one or more processors, cause the one or more processors to execute a method of processing information of a structural object is devised. The method includes acquiring data of a development-view image of the structural object, displaying the development-view image of the structural object on a display, receiving a drawing of a diagnosis target image indicating a diagnosis target in the development-view image of the structural object, displaying, on the display, an input screen for inputting assessment-related information including an assessment result of the diagnosis target indicated by the diagnosis target image, receiving an input of the assessment-related information including the assessment result via the input screen, and storing, in a memory, coordinates of the diagnosis target image and the received assessment-related information in association with each other.

In another aspect of the present invention, another information processing apparatus is devised. The another information processing apparatus includes circuitry configured to acquire data of a development-view image of a structural object, display the development-view image of the structural object on a display, automatically select a diagnosis target from the development-view image of the structural object, receive an input of assessment-related information of the diagnosis target, and automatically store, in a memory, coordinates of the diagnosis target and the assessment-related information of the diagnosis target in association with each other.

In another aspect of the present invention, a system to access a structural object is devised. The system includes circuitry configured to acquire data of a development-view image of the structural object, display the development-view image of the structural object on a display, receive a drawing of a diagnosis target image indicating a diagnosis target in the development-view image of the structural object, display, on the display, an input screen for inputting assessment-related information including an assessment result of the diagnosis target indicated by the diagnosis target image, receive an input of the assessment-related information including the assessment result via the input screen, and output an assessment report including the diagnosis target image indicating the diagnosis target, drawn in the development-view image of the structural object, and the assessment-related information of the diagnosis target indicated by the diagnosis target image.

BRIEF DESCRIPTION OF THE DRAWINGS

A more complete appreciation of the description and many of the attendant advantages and features thereof can be readily obtained and understood from the following detailed description with reference to the accompanying drawings, wherein:

FIG. 4 is a schematic diagram indicating a relationship of development-view image and coordinate data;

FIG. 5 is an example of a diagnosis information management table;

FIG. 6 is an example of a diagnosis target element management table;

FIG. 7 is an example of a sequence diagram illustrating a process of updating data including development-view image;

FIG. 8 is an example of a sequence diagram illustrating a process of generating data of a submission document;

FIGS. 9A, 9B, 9C, and 9D illustrate a scheme of creating a submission document according to an embodiment;

FIG. 22 is another example of a screen when inputting the diagnosis target image in the diagnosis position input screen;

FIG. 36 illustrates a variant example of diagnosis information input screen; and FIG. 37 illustrates a conventional scheme of creating a submission document.

The accompanying drawings are intended to depict embodiments of the present invention and should not be interpreted to limit the scope thereof. The accompanying drawings are not to be considered as drawn to scale unless explicitly noted.

DETAILED DESCRIPTION

A description is now given of exemplary embodiments of the present inventions. It should be noted that although such terms as first, second, etc. may be used herein to describe various elements, components, regions, layers and/or units, it should be understood that such elements, components, regions, layers and/or units are not limited thereby because such terms are relative, that is, used only to distinguish one element, component, region, layer or unit from another region, layer or unit. Thus, for example, a first element, component, region, layer or unit discussed below could be termed a second element, component, region, layer or unit without departing from the teachings of the present inventions.

In addition, it should be noted that the terminology used herein is for the purpose of describing particular embodiments only and is not intended to be limiting of the present inventions. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Hereinafter, a description is given of a diagnosis or assessment system according to an embodiment with reference to the drawings.

Figure 1:
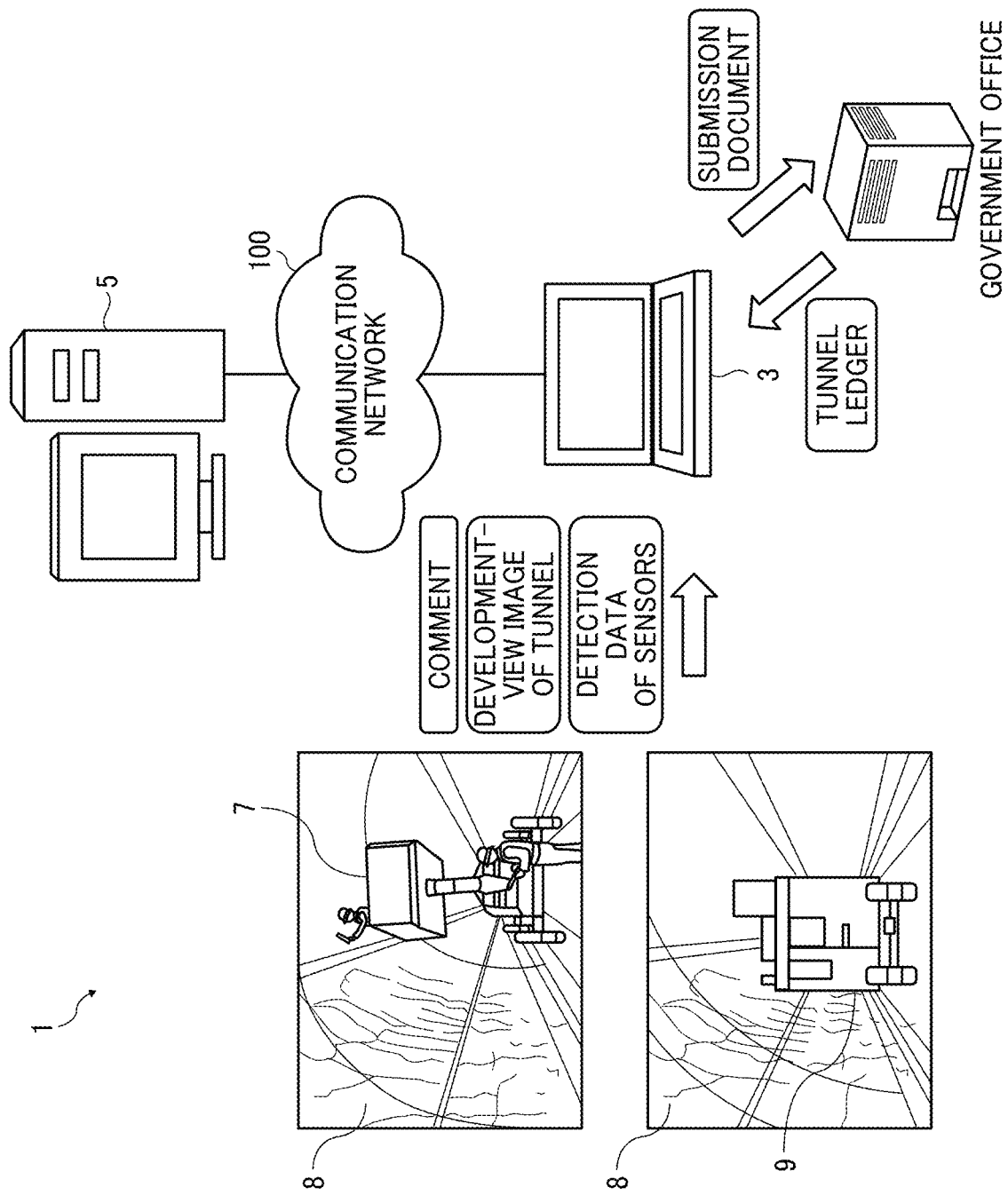
FIG. 1 is a schematic configuration of a diagnosis system according to an embodiment.

System Configuration:

Hereinafter, a description is given of an example of a system configuration of the diagnosis system 1 with reference to FIG. 1. FIG. 1 is a schematic diagram of a diagnosis system 1 of the embodiment. In this description, the diagnosis includes any act or process of identifying the cause or nature of a condition, situation, or potential problem (such as abnormality) of an object such as structural object (e.g., tunnel). The examples of act or process of diagnosis include investigation, analysis, assessment (evaluation), etc. For example, assessment is any act or process of determining the condition, situation, or problem of the object, which is a target for diagnosis. In this description, the diagnosis system 1 can be also referred to as the assessment system. Further, in this description, for simplicity, the terms of "diagnosis" and "assessment" are interchangeably used.

As illustrated in FIG. 1, the diagnosis system 1 includes, for example, a diagnosis processing terminal 3, and a diagnosis management server 5 connected via a communication network 100 wirelessly or by wire. In this description, the diagnosis processing terminal 3 and the diagnosis management server 5 are examples of information processing apparatuses or terminals used for processing data and information related to the structural object (e.g., tunnel).

The diagnosis processing terminal 3 and the diagnosis management server 5 included in the diagnosis system 1 can communicate with each other via the communication network 100. The communication network 100 is constructed using a network, such as the Internet, a mobile communication network, a local area network (LAN), or the like. The communication network 100 can employ not only a wired communication network but also a wireless communication network such as 3rd generation (3G), worldwide interoperability for microwave access (WiMAX), and long term evolution (LTE). Further, the diagnosis processing terminal 3 can be configured to communicate using short-range communication technology such as near field communication (NFC: registered trademark).

As illustrated in FIG. 1, the inspector riding on the inspection vehicle 7 inspects the tunnel 8 by marking inspection findings (e.g., cracks) with a special chalk on a surface of the tunnel 8, and records a width of each crack in a field inspection book. While inspecting the tunnel 8, the inspector records detail information of inspection findings indicating the status or condition of the inspection findings and evaluation results of the inspection findings in the field inspection book. Further, an assistant standing near the inspection vehicle 7 can write the detail information of inspection findings spoken by the inspector in the field inspection book, and take pictures of the tunnel 8 in some cases. The inspection findings means any kind of findings observed on the tunnel surface, such as potential or imminent abnormalities (e.g., initial defects, aging defects, damages, deformations) that may cause problems, and non-abnormalities portions (e.g., stains) that may not cause problems.

Further, the inspector can put on a helmet put equipped with a small microphone and a small camera, in which comments made by the inspector can be recorded with the small microphone and target portions can be photographed with the small camera. In this case, the recorded voice information can be recognized by a voice recognition device and digitized as data, and the digitized data can be automatically recorded in an electronic recording device used as the field inspection book, such as a tablet personal computer (PC) or the like, together with the images photographed using the small camera.

Then, a vehicle 9 equipped with a camera unit (image capture device) travels from the entrance to the exit of the tunnel 8, while capturing images of the inner surface of the tunnel 8 from an entry to an exit of the tunnel 8 to acquire images of the inner surface of the tunnel 8, which is to be described later with reference to FIG. 4. Hereinafter, images of the captured inner surface of the tunnel 8 are collectively referred to as development-view image 201 of the tunnel, which corresponds to a panoramic image combining a plurality of images of a plurality of spans (formworks) of the tunnel 8. The development-view image 201 is generated by performing image processing on a plurality of mages of the inner surface of the tunnel 8 captured by the camera unit. Since the development-view image 201 includes portions marked with the special chalk by the inspector, the user of the diagnosis processing terminal 3 can easily confirm positions and shapes of the inspection findings by checking the development-view image 201 after the inspection at the field. The development-view image 201 can be also be referred to as the image data of tunnel, which is an example of image data of the structural object generated using given image processing.

In addition to the camera unit, the vehicle 9 also includes a first range sensor for measuring a travel distance of the vehicle 9, a second range sensor for measuring a distance between the vehicle 9 and the inner surface of the tunnel 8, a gyro sensor for detecting an angle (posture) and an angular velocity (or angular acceleration) of the vehicle 9. The second ranging sensor is, for example, a time-of-flight (TOF) sensor or a light detection and ranging (LIDAR) sensor. The development-view image 201 obtained by the camera unit of the vehicle 9, and each detection data obtained from each sensor disposed in the vehicle 9 (e.g., first and second ranging sensors, gyro sensor) are transmitted to the diagnosis management server 5 via the diagnosis processing terminal 3, and are managed by the diagnosis management server 5. Alternatively, the development-view image 201 and the detection data can be directly transmitted to the diagnosis management server 5, or any storage device on a cloud that is accessible from the diagnosis management server 5.

In some regions, such as European continent and America, vehicle drivers keep to the right side of the road, so an image of the structural object (e.g., tunnel wall) on the right side of the vehicle in the traveling direction is captured and measured with the camera unit. In another region, such as United Kingdom and Japan, vehicle drivers keep to the left side of the road, so an image of the structural object (e.g., tunnel wall) on the left side of the vehicle in the traveling direction is captured and measured with the camera unit.

The diagnosis processing terminal 3 is a computer used for receiving an input of various data, such as diagnosis target image, diagnosis region, and diagnosis information, to be described later. A user (e.g., operator) uses the diagnosis processing terminal 3 to input various data related to the structural object (e.g., tunnel), such as the development-view image 201, generated by capturing the images of tunnel 8 from an entrance to an exit of the tunnel 8 and processing, and the detail information of inspection findings recorded on the field inspection book by the inspector or assistant for the tunnel 8, and the detection data obtained by each sensor for the tunnel 8. In this description, the tunnel 8 is described as an example of the structural object, but the structural object is not limited thereto. In another example, the data related to the structural object can be transmitted to another device such as the diagnosis management server 5, and then transferred from another device to the diagnosis processing terminal 3.

Further, the user of the diagnosis processing terminal 3 inputs data of the tunnel ledger obtained from the government office in the diagnosis processing terminal 3. The tunnel ledger includes data of the tunnel properties such as the length and height of the tunnel. Alternatively, the diagnosis processing terminal 3 can receive the data of the tunnel ledger from a server of the government office. In this case, the diagnosis processing terminal 3 can be used as an input device to which data is input.

Further, a browser is installed in the diagnosis processing terminal 3. The diagnosis processing terminal 3 can display the development-view image 201 transmitted from the diagnosis management server 5 using the browser.

Further, the user of the diagnosis processing terminal 3 performs a drawing of an image of given pattern, such as line or the like, over the observed inspection findings (e.g., crack) on the development-view image 201. The drawn image corresponding to the observed inspection findings is stored, for example, in a memory of the diagnosis management server 5 in association with coordinates indicating a position of the drawn image, and a numerical value (e.g., width) of the drawn image.

The user of the diagnosis processing terminal 3 downloads data of a submission document including, for example, the observed inspection findings chart created by drawing the observed inspection findings, from the diagnosis management server 5, and submits the printed submission document or the electronic data of the submission document (i.e., non-printed data) to the government office or the like. For example, the communication unit 51 of the diagnosis management server 5 transmits the data of the submission document including, for example, the observed inspection findings chart created by drawing of the observed inspection findings, to the diagnosis processing terminal 3 via the communication network 100. As a result, the communication unit 31 of the diagnosis processing terminal 3 receives the data of the submission document.

In one example, the communication unit 31 of the diagnosis processing terminal 3 transmits the data of the submission document to a printing apparatus, and after printing the submission document, the user of the diagnosis processing terminal 3 submits the printed paper to the government office or the like.

Alternatively, the communication unit 31 of the diagnosis processing terminal 3 transmits the data of the submitted document to the government office or the like via the communication network 100.

Alternatively, the communication unit 31 of the diagnosis processing terminal 3 stores the data of the submission document on a recording medium such as DVD-R, and then, the user of the diagnosis processing terminal 3 submits the recording media to the government office or the like.

The communication unit 31 and the storing/reading unit 39 can be used as an output unit when submitting the submission document (electronic data or printed paper) to the government office or the like. In this case, the diagnosis processing terminal 3 can be used as an output device from which data is output.

Further, in order to ensure credibility or authenticity of the submission document such as electronic data and printed sheets submitted to the national government office or the like, it is preferable to apply tamper-proof processing to the submission document.

The diagnosis management server 5 manages various data, such as the development-view image 201, detail information of the inspection findings, and the tunnel ledger. Further, the diagnosis management server 5 manages data obtained by drawing an image such as line or the like over the observed inspection findings (e.g., crack) associated with coordinates indicating the position of the drawn image on the development-view image 201, and the numerical value (e.g., width) of the drawn image.

Hardware Configuration of Diagnosis System:

Hereinafter, a description is given of a hardware configuration of the diagnosis processing terminal 3 and the diagnosis management server 5 configuring the diagnosis system 1 with reference to FIG. 2.

Figure 2:
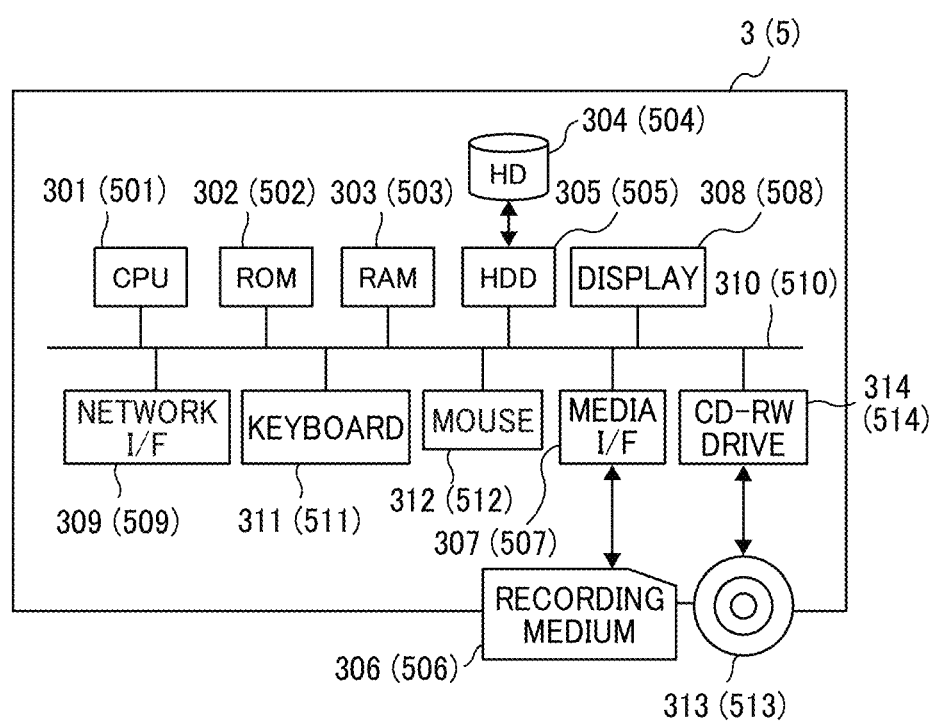
FIG. 2 is a hardware block diagram of a diagnosis processing terminal, and a diagnosis management server.

Hardware Configuration of Diagnosis Processing Terminal:

FIG. 2 is an example of a hardware block diagram of the diagnosis processing terminal 3, and also an example of a hardware block diagram of the diagnosis management server 5 indicated by reference symbols in parentheses.

As illustrated in FIG. 2, the diagnosis processing terminal 3 includes, for example, a central processing unit (CPU) 301, a read only memory (ROM) 302, a random access memory (RAM) 303, a hard disk (HD) 304, a hard disk drive (HDD) 305, a media interface (I/F) 307, a display 308, a network I/F 309, a keyboard 311, a mouse 312, a compact disc-rewritable (CD-RW) drive 314, and a bus line 310.

The CPU 301 controls the operation of the diagnosis processing terminal 3 entirely. The ROM 302 stores programs to be executed by the CPU 301. The RAM 303 is used as a work area of the CPU 301. The HD 304 stores various data such as programs. The HDD 305 controls reading and writing of various data to the HD 304 under the control of the CPU 301. The media I/F 307 controls reading and writing (storing) of data from or to a recording medium 306, such as a flash memory. The display 308 displays various information such as cursor, menu, window, text, or image. The network I/F 309 is an interface circuit for performing data communication using the communication network 100. The keyboard 311 is an example of input units, having a plurality of keys used for inputting characters, numerals, various instructions or the like. The mouse 312 is one type of input units for selecting and executing various instructions, selecting a process target, moving a cursor, and the like. The CD-RW drive 314 controls reading and writing of various data from and to a CD-RW 313, which is an example of a removable recording medium.

Further, as illustrated in FIG. 2, the diagnosis management server 5 includes, for example, a CPU 501, a ROM 502, a RAM 503, an HD 504, an HDD 505, a media I/F 507, a display 508, a network I/F 509, a keyboard 511, a mouse 512, a CD-RW drive 514, and a bus line 510. The configuration of these components are similar to those of the above-described configuration of the CPU 301, the ROM 302, the RAM 303, the HD 304, the HDD 305, the media I/F 307, the display 308, the network I/F 309, the keyboard 311, the mouse 312, the CD-RW drive 314, and the bus line 310, and thereby descriptions of these are omitted.

Further, a DVD recordable (DVD-R) drive can be used instead of the CD-RW drive 314 or 514. In the embodiment, the diagnosis processing terminal 3 and the diagnosis management server 5 can be configured as a single computer or can be configured using a plurality of computers by dividing each part (functional unit, or storage) into the plurality of computers.

Figure 3:
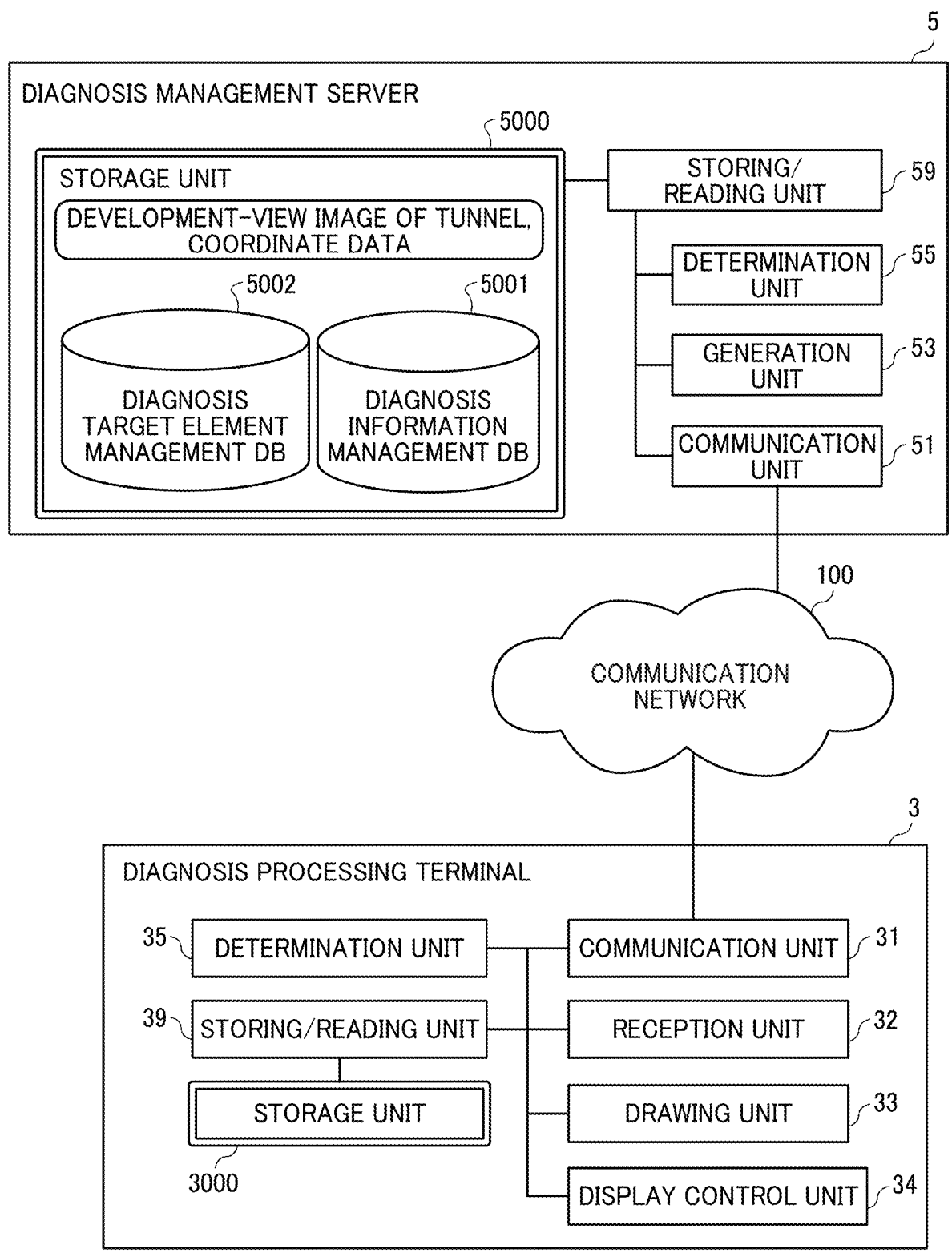
FIG. 3 is a functional block diagram of the diagnosis system.

Functional Configuration of Diagnosis System:

Hereinafter, a description is given of a functional configuration of the diagnosis system 1 with reference to FIGS. 3 to 6. FIG. 3 is an example of a functional block diagram of the diagnosis system 1.

Functional Configuration of Diagnosis Processing Terminal:

As illustrated in FIG. 3, the diagnosis processing terminal 3 includes, for example, a communication unit 31, a reception unit 32, a drawing unit 33, a display control unit 34, a determination unit 35, and a storing/reading unit 39. Each of these units indicates a function or functional unit implemented by operating any of the hardware components illustrated in FIG. 2 under instructions of the CPU 301 executing programs loaded on the RAM 303 from the HD 304. The diagnosis processing terminal 3 further includes a storage unit 3000 implemented by the RAM 303 and the HD 304 (FIG. 2).

Hereinafter, a description is given of each functional unit of the diagnosis processing terminal 3.

The communication unit 31, implemented by the network I/F 309 and an instruction from the CPU 301 (FIG. 2), transmits and receives various data or information to and from other terminals, devices, or systems via the communication network 100.

The reception unit 32 is typically implemented by an instruction from the CPU 301 (FIG. 2). When the reception unit 32 receives signals from the keyboard 311 and/or the mouse 312 operated by a user, the reception unit 32 receives various operations performed by a user.

The drawing unit 33, implemented by an instruction from the CPU 301 (FIG. 2), draws a pattern, such as a line or an area (e.g., rectangular shape), on an image displayed on the display 308.

The display control unit 34, implemented by an instruction from the CPU 301 (FIG. 2), causes the display 308 to display various images and screens.

The determination unit 35, implemented by an instruction from the CPU 301 (FIG. 2), performs various determinations to be described later.

The storing/reading unit 39, implemented by an instruction from the CPU 301 and the HDD 305, the media I/F 307, and the CD-RW drive 314 (FIG. 2), stores various data in the storage unit 3000, the recording medium 306, and the CD-RW 313, and reads various data from the storage unit 3000, the recording medium 306, and the CD-RW 313.

Functional Configuration of Diagnosis Management Server:

As illustrated in FIG. 3, the diagnosis management server 5 includes, for example, a communication unit 51, a generation unit 53, a determination unit 55, and a storing/reading unit 59. Each of these units indicates a function or functional unit implemented by operating any of the hardware components illustrated in FIG. 2 under an instruction from the CPU 501 executing programs loaded to the RAM 503 from the HD 504. The diagnosis management server 5 further includes a storage unit 5000, implemented by the HD 504 (FIG. 2).

Development-View Image and Coordinate Data:

FIG. 4 is a schematic diagram indicating a relationship of the development-view image 201 and coordinate data 201c. As illustrated in FIG. 3, the storage unit 5000 stores various data, such as detail information of inspection findings, the development-view image 201, data of each sensor such as a range sensor, and data of a tunnel ledger. The coordinate data 201c is data generated by the generation unit 53 after the communication unit 51 of the diagnosis management server 5 acquires the development-view image 201 and the detection data from the diagnosis processing terminal 3. The generation method of the coordinate data 201c will be described later.

When the development-view image 201 is output from the camera unit of the vehicle 9, the development-view image 201 is the image data alone without any information regarding a positional relationship between the development-view image 201 and the actual tunnel. If the positional relationship between the development-view image 201 and the actual tunnel is not accurately defined, it would take too much time and effort for the user to identify the location of the inspection findings (e.g., cracks, any defects), found or observed during the inspection, on the development-view image 201. Therefore, in order to accurately define the positional relationship between the development-view image 201 and the actual tunnel, the coordinate data corresponding to the development-view image 201 is generated.

As illustrated in in FIG. 4, the tunnel is configured with a plurality of spans (formworks) made of certain material such as concrete, in which each span sequentially represents a first span, a second span, a third span, and so on from an entrance to an exit of an actual tunnel. The span indicates each segment having a given width (e.g., 10 meters), which is segmented from the entrance to the exit of the tunnel 8. FIG. 4 illustrates an example of the development-view image 201 composed of images of multiple spans. The span number is specified in the tunnel ledger managed by the government office.

Further, as illustrated in in FIG. 4, the coordinate data is set for the plurality of spans, in which a span number for the coordinate data is set from the left to the right, such that the first span is indicated by a span number "S001," and the second span is indicated by a span number "S002," and so on. In addition, coordinates (xn, ym) are used to indicate a specific position in each span. For example, even if one point in one span and another point in another span (i.e., any two points) in the coordinate data are represented by the same coordinates, since the spans are different, the coordinates of one point in one span and the coordinates of another point in another span indicate different positions in the tunnel. Accordingly, with the coordinate data defining the coordinates (xn, ym) of specific positions in the specific span number, the positional relationship between the development-view image 201 and the actual tunnel can be accurately defined, such that a specific location of the inspection finding (e.g., defect) marked on the actual tunnel can be identified using the coordinate system of the development-view image 201. As above described, the development-view image 201 are associated with coordinate data of the tunnel 8. In case of a tunnel without spans, a specific position in the development-view image is identified using a position coordinate alone without using the span number such as "S001."

Diagnosis Information Management Table:

FIG. 5 is an example of a diagnosis information management table. The storage unit 5000 stores and manages a diagnosis information management database (DB) 5001 (FIG. 3) including the diagnosis information management table of FIG. 5. The coordinate data 201c (FIG. 4) is generated by the diagnosis management server 5 as described above. The diagnosis processing terminal 3 receives a user operation to draw an image such as a line or the like over the observed inspection findings, such as cracks, displayed on the development-view image 201. With the coordinate data 201c and the drawing made by the user, the specific position of the observed inspection findings on the development-view image 201 is identified. Specifically, the diagnosis management server 5 uses the diagnosis information management table (FIG. 5) to manage the coordinates of the identified observed inspection findings portion, indicating a position of the identified observed inspection findings portion.

As illustrated in FIG. 5, the diagnosis information management table stores various items, such as a diagnosis region number, a span number (formwork number), coordinates within a span of a diagnosis region, a height and width of a diagnosis region, a photograph number, a type of observed inspection findings and abnormality (potential abnormalities), an evaluation result, and detail information of inspection findings, which are associated with each other. In this description, the diagnosis information may be also referred to as the assessment-related information or assessment information.

The diagnosis region number is identification information identifying a group including a diagnosis region to be described later. The span number (formwork number) is a number assigned to each span of the tunnel 8. The span number is specified in the tunnel ledger managed by the government office. The span number corresponds to a specific span number in the coordinate data 201c illustrated in FIG. 4, and is a value indicating the specific span number of the tunnel 8.

The coordinates within the span related to the diagnosis region indicate specific position coordinates in the coordinate data 201c illustrated in FIG. 4, and indicate the position coordinates of a specific point (e.g., start point) of the diagnosis region in a specific span that is counted, for example, from the origin point of the specific span.

The height and width of the diagnosis region indicate the height and the width of a specific diagnosis region with respect to the origin point of the specific span related to the specific diagnosis region. The height and width of the diagnosis region indicate values identifying the entire specific diagnosis region.

The photograph number is identification information identifying a photograph attached to the photograph ledger.

The type of observed inspection findings and abnormality indicate a type of inspection findings and abnormality at the inspection object and portion inspected by the inspector.

The evaluation result indicates an evaluation of the diagnosis target inspected by the inspector. Typically, the conditions of the diagnosis target are ranked using the evaluation levels of "S, A, B, and C," in which "S" is the worst condition, and the condition becomes less severe in the order of "S, A, B, and C." The evaluation result may be also referred to as the assessment result in this description.

The detail information of inspection findings is contents of information of inspection findings recorded by the inspector and/or the assistant (FIG. 1).

Diagnosis Target Element Management Table:

FIG. 6 illustrates an example of a diagnosis target element management table. The storage unit 5000 stores and manages a diagnosis target element management DB 5002 (FIG. 3) including the diagnosis target element management table of FIG. 6. As illustrated in FIG. 6, the diagnosis target element management table stores various items, such as a diagnosis region number, a span number (formwork number), an element number, coordinates of a start point of a diagnosis target element image, coordinates of an end point of a diagnosis target element image, and a width of a diagnosis target element (mm) in association with each other.

The diagnosis region number and the span number (formwork number) are the same as those in the diagnosis information management table (FIG. 5). The diagnosis information management table (FIG. 5) and the diagnosis target element management table (FIG. 6) are associated with each other using the diagnosis region number and the span number (formwork number).

The element number is identification information identifying a diagnosis target element image, which is the element of the diagnosis target image.

The coordinates of the start point of the diagnosis target element image indicate the coordinates of the start point when the diagnosis target element image is drawn in a specific span in the development-view image 201. For example, in an example case of FIG. 25, coordinates of a start point "p21" indicate the start point of a first diagnosis target element image "e21."

The coordinates of the end point of the diagnosis target element image indicate the coordinates of the end point when the diagnosis target element image is drawn in a specific span in the development-view image 201. For example, in an example case of FIG. 25, coordinates of an end point "p22" indicate the end point of the first diagnosis target element image "e21." Further, each of the coordinates of the start point and the coordinates of the end point of the diagnosis target element image indicates a specific position coordinate in the coordinate data 201c illustrated in FIG. 4.

The width (mm) of the diagnosis target element represents a width of something, such as cracks when the diagnosis target element is cracks. For example, an example case of FIG. 25, a value is input to a width input screen "ws1" by a user. When the user inputs a numerical value in the width input screen "ws1," the reception unit 32 receives the input numerical value, and then the display control unit 34 displays the input numerical value (e.g., "0.5") as illustrated in FIG. 26.

Hereinafter, a description is given of a functional configuration of the diagnosis management server 5.

In the following description, each functional unit of the diagnosis management server 5 is described in relation with any of the components illustrated in FIG. 2 used for implementing each functional unit of the diagnosis management server 5.

The communication unit 51 of the diagnosis management server 5 (FIG. 3), implemented by an instruction of the CPU 501 (FIG. 2) and the network I/F 509 (FIG. 2), transmits and receives various data or information to and from other devices or terminals via the communication network 100.

The generation unit 53, implemented by an instruction from the CPU 501 (FIG. 2), generates the coordinate data 201c (FIG. 4) based on the development-view image 201 and the detection data of sensors, such as the ranging sensor, acquired from the diagnosis processing terminal 3 by the communication unit 51 of the diagnosis management server 5.

Specifically, the generation unit 53 generates the coordinate data 201c for the development-view image 201 using the detection data acquired from the sensors (e.g., first and second ranging sensors, gyro sensors) installed in the vehicle 9 via the diagnosis processing apparatus 3 as described above.

While the vehicle 9 is capturing images of a tunnel inner surface while traveling through the tunnel 8, it is practically difficult for the vehicle 9 to travel at a constant speed in the tunnel 8, and to maintain a constant distance between the vehicle 9 and the tunnel inner surface. Further, the vehicle 9 is often tilted at an angle due to dents on the road surface in the tunnel 8.

Therefore, the generation unit 53 uses the detection data of each sensor to generate the coordinate data for the development-view image 201 while correcting the coordinate data. In a case of FIG. 4, when the position of the left upper corner of the span S001 in the coordinate data 201c and the upper left corner of the first span of the development-view image 201 are matched, the origin point is determined, with which the generation unit 53 can generate the coordinate data for the development-view image 201 based on the set origin point.

Further, the diagnosis management server 5 can set the origin point according to a user preference, such as an input from an administrator, or can automatically set the origin point at the generation unit 53. When the origin point is set automatically, the luminance value of the photographed image rapidly changes at the entrance of the tunnel (i.e., a boundary between the outside and inside of the tunnel), in which the generation unit 53 can easily identify the entrance of the tunnel from the photographed image.

Further, the generation unit 53 generates data of a submission document (e.g., observed inspection findings chart, photograph ledger, tunnel inspection result summary table) to be submitted to the government office based on various data managed by the diagnosis information management DB 5001 and a diagnosis target element management DB 5002.

The determination unit 55, implemented by an instruction from the CPU 501 (FIG. 2), performs a determination process when the generation unit 53 is to generate data of the submission document.

The storing/reading unit 59, implemented by an instruction from the CPU 501 and the HDD 505 (FIG. 2), stores various data in the storage unit 5000, and reads out various data stored in the storage unit 5000.

Processing and Operation:

Hereinafter, a description is given of the processing and operation of the embodiment with reference to FIGS. 7 to 35. FIG. 7 is an example of a sequence diagram illustrating a process of updating data including the development-view image. FIG. 8 is an example of a sequence diagram illustrating a process of generating data of a submission document. FIGS. 9A, 9B, 9C, and 9D illustrate a scheme of creating a submission document according to one embodiment.

At first, as illustrated in FIG. 9A, the diagnosis processing terminal 3 is input with data of a tunnel ledger acquired from the government office in accordance with a user operation (step S1). Hereinafter, the data input by the user using the diagnosis processing terminal 3 is referred to as "field inspection data of the target tunnel."

Further, the diagnosis processing terminal 3 is input with the development-view image, data of the detail information of inspection findings, and detection data of one or more sensors (e.g., range sensor), respectively obtained from the vehicle 9 in accordance with the user operation (step S2).

The communication unit 31 of the diagnosis processing terminal 3 uploads the data of the tunnel ledger, input in step S1, and each data (e.g., the development-view image 201, data of detail information of inspection findings, and detection data of sensors such as a range sensor) input in step S2, to the diagnosis management server 5 (step S3). As a result, the communication unit 51 of the diagnosis management server 5 receives the data, such as the data of the tunnel ledger.

The diagnosis management server 5 generates the coordinate data 201c (FIG. 4) based on the development-view image 201 and the detection data.

The storing/reading unit 59 stores the data, such as the data of the tunnel ledger, received in step S3, and the coordinate data 201c, generated in step S4, in the storage unit 5000 in association with one another (step S5).

At any time when the user inputs the diagnosis target image, as illustrated in FIG. 8, the communication unit 31 of the diagnosis processing terminal 3 transmits a request for the field inspection data of the target tunnel, such as the tunnel ledger or the like, to the diagnosis management server 5 in accordance with the user operation (step S11). As a result, the communication unit 51 of the diagnosis management server 5 receives the request for the data, such as a tunnel ledger.

Then, in the diagnosis management server 5, the storing/reading unit 59 reads the field inspection data of the target tunnel, such as data of the tunnel ledger or the like, stored in the storage unit 5000 in step S5 (step S12).

The communication unit 51 transmits the field inspection data of the target tunnel, such as the tunnel ledger, read in step S12, to the diagnosis processing terminal 3 (step S13). As a result, the development-view image 201 is displayed at the diagnosis processing terminal 3 using the browser.

As illustrated in FIG. 9A, in accordance with the user operation, the diagnosis processing terminal 3 performs a process of drawing a diagnosis target image (including diagnosis target element image) on a part of the development-view image 201 (hereinafter, partial development-view image 202), and inputting diagnosis information (step S14). The process of step S14 will be described in detail later.

The communication unit 31 transmits a request for creating a submission document to be submitted to the government office or the like to the diagnosis management server 5, together with the data of the drawn diagnosis target element image, and the data of the input diagnosis information (step S15). As a result, the communication unit 51 of the diagnosis management server 5 receives the request for creating the submission document with the data of the diagnosis target element image and the data of the diagnosis information.

Then, in the diagnosis management server 5, the storing/reading unit 59 stores the data of the diagnosis information and the data of the diagnosis target element image, respectively, in the diagnosis information management DB 5001 and the diagnosis target element management DB 5002 (step S16).

Further, in order to create the submission document, the storing/reading unit 59 reads the data of diagnosis information and the data of the diagnosis target element image, respectively from the diagnosis information management DB 5001 and the diagnosis target element management DB 5002, and also reads the data, such as the tunnel ledger or the like, from the storage unit 5000 (step S17).

Then, the generation unit 53 of the diagnosis management server 5 generates the data of the submission document (e.g., observed inspection findings chart, photograph ledger, tunnel inspection result summary table), illustrated in FIG. 9, using the data of diagnosis information, the data of the diagnosis target element image, and the data of tunnel ledger or the like (step S18).

The communication unit 51 transmits the data of the submission document to the diagnosis processing terminal 3 (step S19). As a result, the communication unit 31 of the diagnosis processing terminal 3 receives the data of the submission document.

As illustrated in FIG. 9A, the diagnosis processing terminal 3 prints out the data of the submission document to be submitted to the government office or the like (step S20).

Figure 9C:
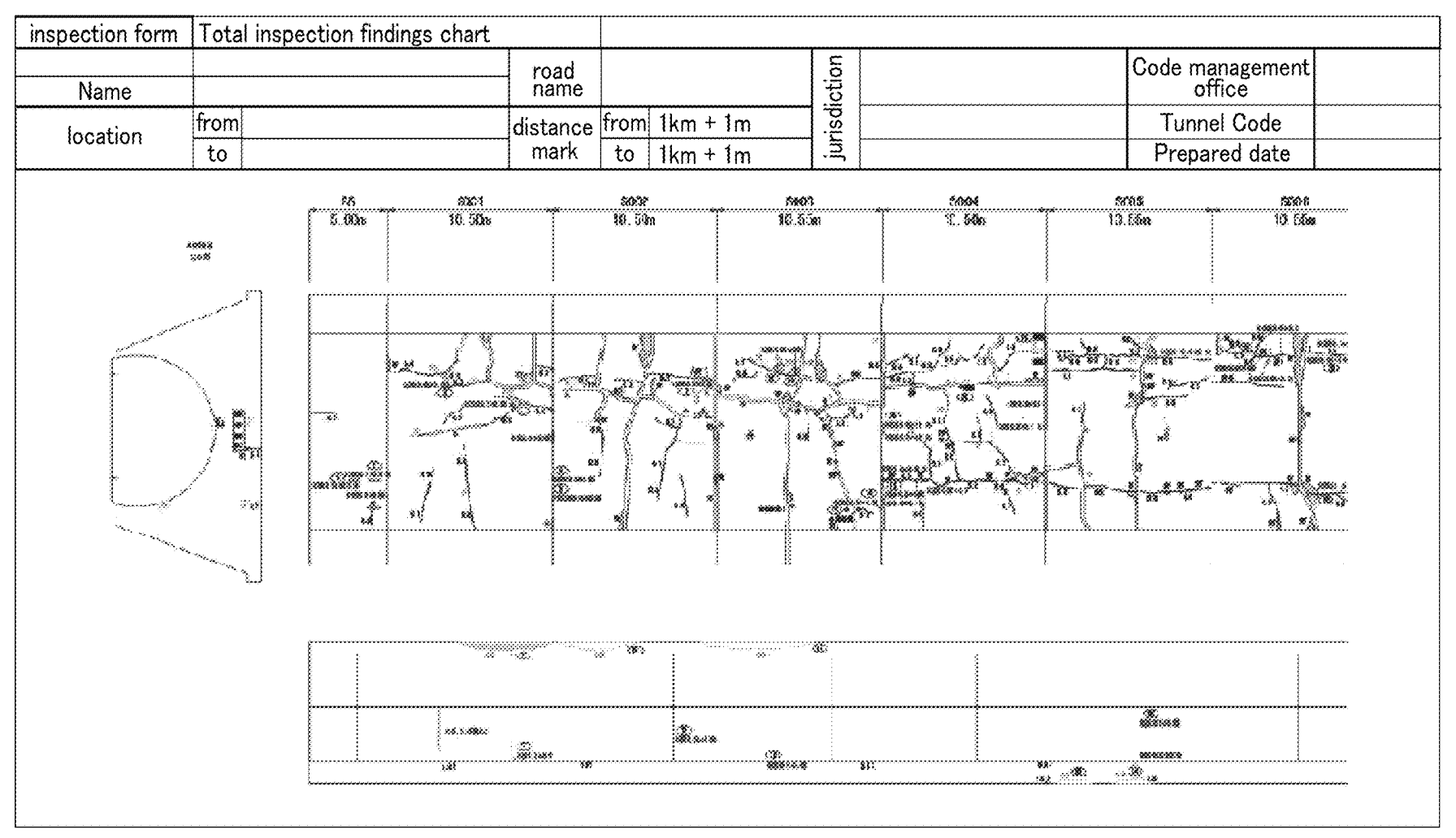

As illustrated in FIGS. 9B, 9C, and 9D, the submission document includes, for example, the tunnel inspection result summary table (FIG. 9B), the observed inspection findings chart (FIG. 9C), and the photograph ledger (FIG. 9D). By performing the above described processing, the inspection contractor can submit the data of the submission document to the government office using printed sheets. Alternatively, if the government rule, such as the national government rule, allows the submission of the data of the submission document to the government office using electronic data alone, the inspection contractor can submit the electronic data of the submission document to the government office without printing the data of the submission document.

Further, the submission document maybe submitted to the government office from one entity that has created the submission document, or the submission document created by one entity is transferred to another entity, and then submitted to the government office from another entity.

Figure 10:
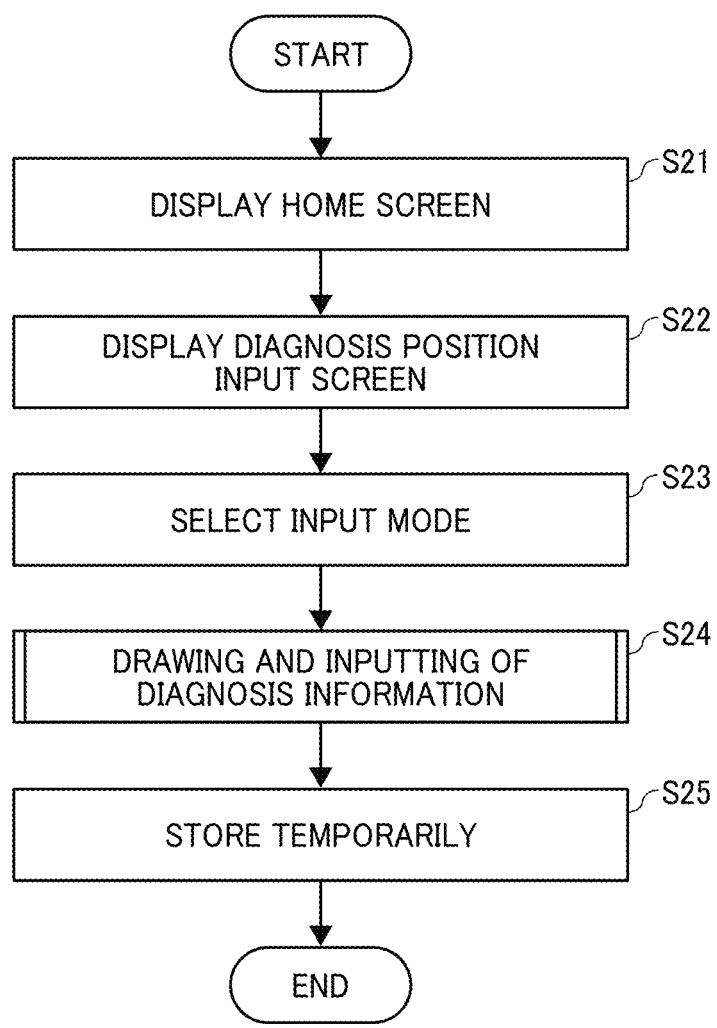
FIG. 10 is an example of a flowchart illustrating a process of drawing and inputting of diagnosis information.
Figure 14:
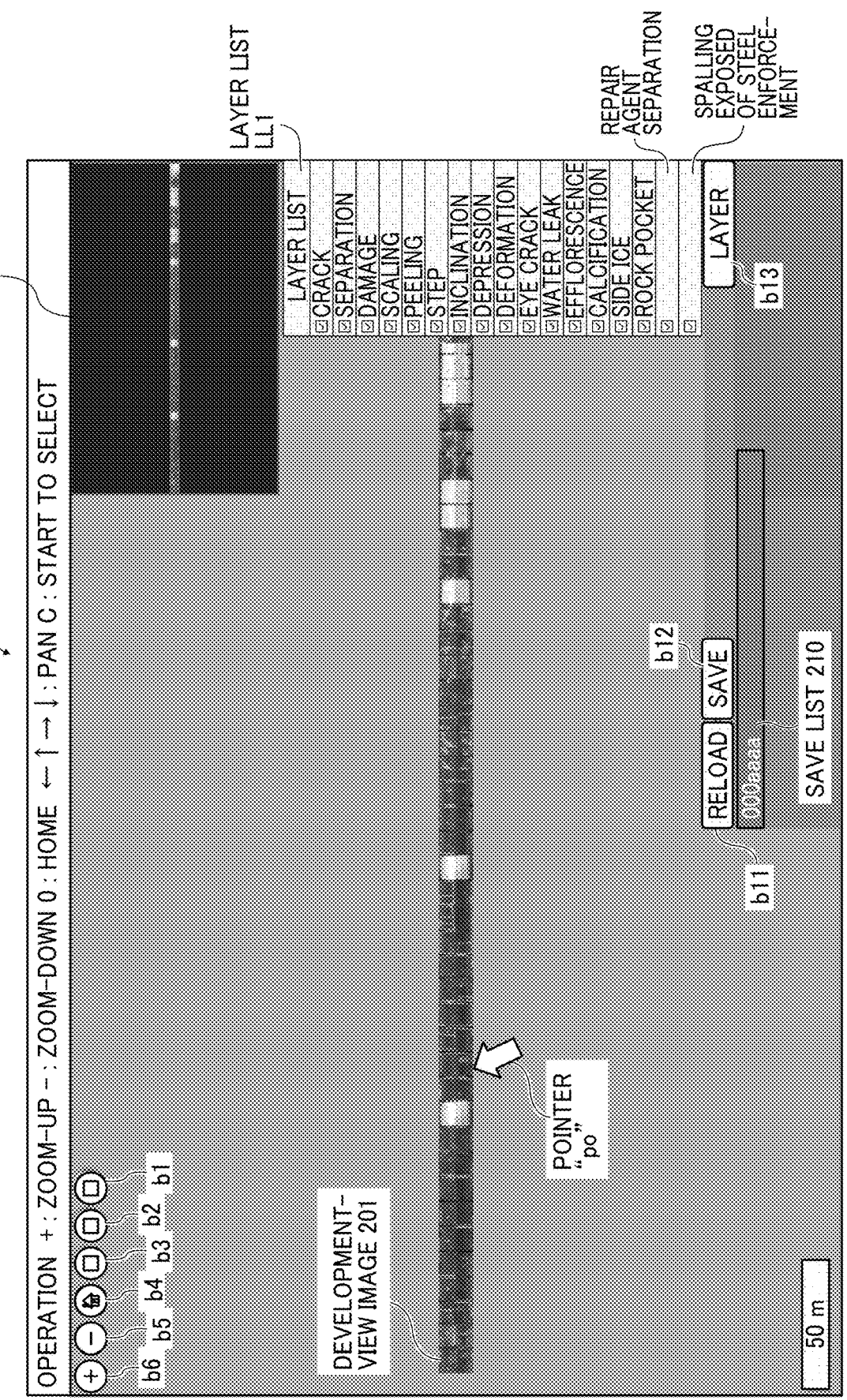
FIG. 14 is an example of a home screen.
Figure 15:
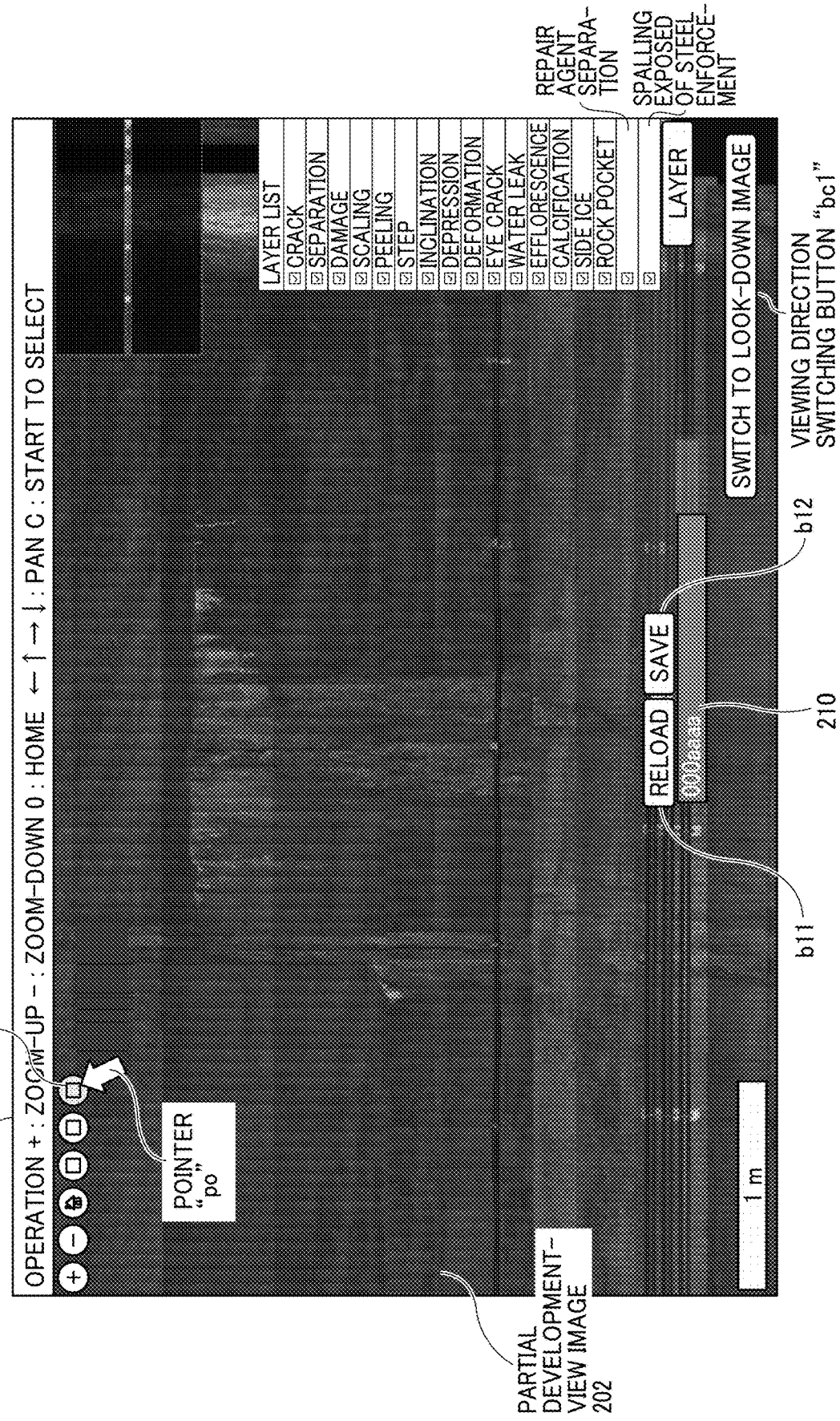
FIG. 15 is an example of a diagnosis position input screen when an input mode of a diagnosis target image (e.g., drawing of an area) is selected.

Drawing and Inputting of Diagnosis Information:

Hereinafter, a description is given of the detail of step S14 with reference to FIGS. 10, 14 and 15. FIG. 10 is an example of a flowchart illustrating the steps of the drawing of the image and inputting of the diagnosis information. FIG. 14 is an example of a home screen SC1. FIG. 15 is an example of a diagnosis position input screen SC2 when a first input mode of a diagnosis target image (i.e., drawing of area) is selected.

Referring to FIG. 10, at first, when a user operates the diagnosis processing terminal 3, the display control unit 34 displays the home screen SC1 (FIG. 14) on the display 308 (step S21).

As illustrated in FIG. 14, the home screen SC1 displays a development-view image 201 on the center of the home screen SC1. Further, as illustrated in FIG. 14, the home screen SC1 displays a total image screen SC10 showing an entire image of the development-view image 201 on the right upper corner of the home screen SC1. Further, as illustrated in FIG. 14, a plurality of selection buttons "b1" to "b6" is displayed on the upper left corner of the home screen SC1. The selection button "b1" is used for selecting a first input mode for inputting an area of the diagnosis target image (i.e., drawing of area). The selection button "b2" is used for selecting a second input mode for inputting lines of the diagnosis target image (i.e., drawing of line pattern). The selection button "b3" is used for selecting a third input mode for inputting the diagnosis region. When selected, the home button "b4" is used for returning to the home screen SC1. The reduction button "b5" is used for reducing a display size of the development-view image 201. The enlargement button "b6" is used for enlarging a display size of the development-view image 201.

Further, as illustrated in FIG. 14, "RELOAD" button "b11" is displayed at the lower center portion of the home screen SC1. The "RELOAD" button b11 is used for displaying a pull-down menu that lists data of the diagnosis region already uploaded to the diagnosis management server 5. Similarly, as illustrated in FIG. 14, "SAVE" button "b12" is displayed at the lower center portion of the home screen SC1. The "SAVE" button "b12" is used for collectively transmitting data of the diagnosis region, temporarily stored in the diagnosis processing terminal 3, to the diagnosis management server 5 to save the data of a diagnosis region in the diagnosis management server 5. Further, a save list 210 is also displayed at the lower center portion of the home screen SC1. The save list 210 is used for displaying names of data of diagnosis regions downloaded from the diagnosis management server 5, and names of data of diagnosis regions temporarily stored in the diagnosis processing terminal 3. When the user selects the save list 210 using the pointer "po," the display control unit 34 displays the diagnosis position input screen SC2 showing the corresponding diagnosis region.

Further, as illustrated in FIG. 14, a layer list LL1 is displayed on the right side of the home screen SC1. The layer list LL1 lists types of inspection findings, such as defects. For example, the layer list LL1 displays the types of defects, such as a crack, a water leakage, and a calcification. When a check box of the layer list LL1 is checked, a layer of the checked defect is displayed on the development-view image 201. Further, as illustrated in FIG. 14, "LAYER" button "b13" is displayed at the right lower side of the home screen SC1. The "LAYER" button "b13" is used for displaying the layer list LL1 on a top layer.

When a user operates the mouse 312 to select a specific span, to be input with the drawing and diagnosis information, using the pointer "po" on the home screen SC1, the display control unit 34 displays the diagnosis position input screen SC2 on the display 308 as illustrated in FIG. 15 (step S22). The diagnosis position input screen SC2 displays a partial development-view image 202 corresponding to the selected span of the development-view image 201. Further, as illustrated in FIG. 15, a viewing direction switching button "bc1" is displayed on the right lower corner of the diagnosis position input screen SC2. The viewing direction switching button "bc1" is used for switching the viewing direction of the development-view image 201. The switching of the viewing direction will be described later with reference to FIGS. 34 and 35.

When the user selects any one of the selection buttons "b1," "b2," and "b3" using the pointer "po," the reception unit 32 receives the selection of the input mode (step S23).

Then, when the user performs the drawing of image and the inputting of diagnosis information in accordance with the input mode, the drawing of image and the inputting of diagnosis information are processed by the diagnosis processing terminal 3 (step S24). The detail of step S24 will be described later for each input mode.

Then, when the reception unit 32 receives an operation of the mouse 312 and the like performed by the user, the storing/reading unit 39 temporarily stores the data of the diagnosis region generated by performing the drawing of image and the inputting of diagnosis information to the storage unit 3000 (step S25). The drawn image data and the input diagnosis information are to be transmitted to the diagnosis management server 5 from the diagnosis processing terminal 3 in step S15 described above.

Input Mode of Diagnosis Target Image (Drawing of Area):

Hereinafter, a description is given of the detail of step S24 (FIG. 10) when the first input mode for inputting an area of the diagnosis target image (i.e., drawing of an area) is selected with reference to FIGS. 11, and 15 to 22. The first input mode for inputting an area of the diagnosis target image (i.e., drawing of an area) can be referred to as the first input mode of the diagnosis target image in this description. The first input mode of the diagnosis target image (i.e., drawing of an area) is used when the diagnosis target corresponds to inspection findings that can be identified as a certain area, such as calcification and water leakage.

Figure 11:
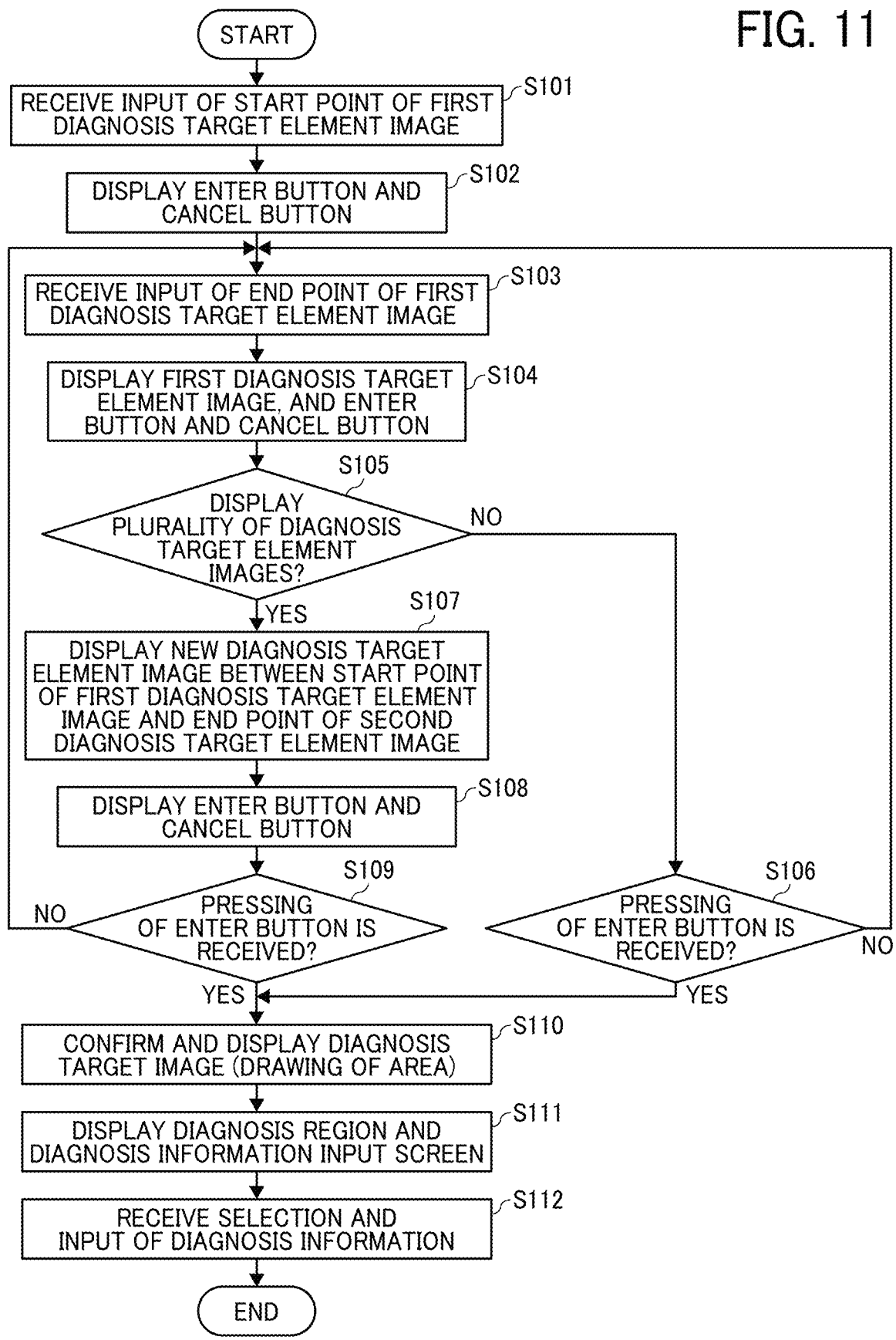
FIG. 11 is an example of a flowchart illustrating processing of a first input mode of a diagnosis target image (e.g., drawing of an area)

FIG. 11 is an example of a flowchart illustrating processing of the first input mode of the diagnosis target image (i.e., drawing of an area). FIG. 15 is an example of the diagnosis position input screen SC2 when the first input mode of a diagnosis target image (i.e., drawing of an area) is selected. FIGS. 16 to 21 are examples of screens when inputting the diagnosis target image (i.e., drawing of an area) on the diagnosis position input screen. FIG. 22 is another example of the diagnosis position input screen.

At first, when a user selects the selection button "b1" in step S23 (FIG. 10) using the pointer "po," the display control unit 34 sets the first input mode of the diagnosis target image (i.e., drawing of an area) as illustrated in FIG. 15.

Figure 16:
FIG. 16 is an example of a screen when inputting the diagnosis target image in the diagnosis position input screen.

In this case, as illustrated in FIG. 16, when the user identifies a start point "p11" of a first diagnosis target element image "e11" using the pointer "po," the reception unit 32 receives the input of the start point "p11" of the first diagnosis target element image "e11" (step S101).

Then, the display control unit 34 displays an enter button "co11" and a cancel button "ca11" around the start point "p11" (step S102). The enter button "co11" is used for entering the input of the diagnosis target image to confirm the input of the diagnosis target element image. The cancel button "ca11" is used for cancelling the input of the identified start point "p11." Further, other enter buttons and other cancel buttons can be respectively used in the same way as the enter button "co11" and the cancel button "ca11" in this description.

Figure 17:
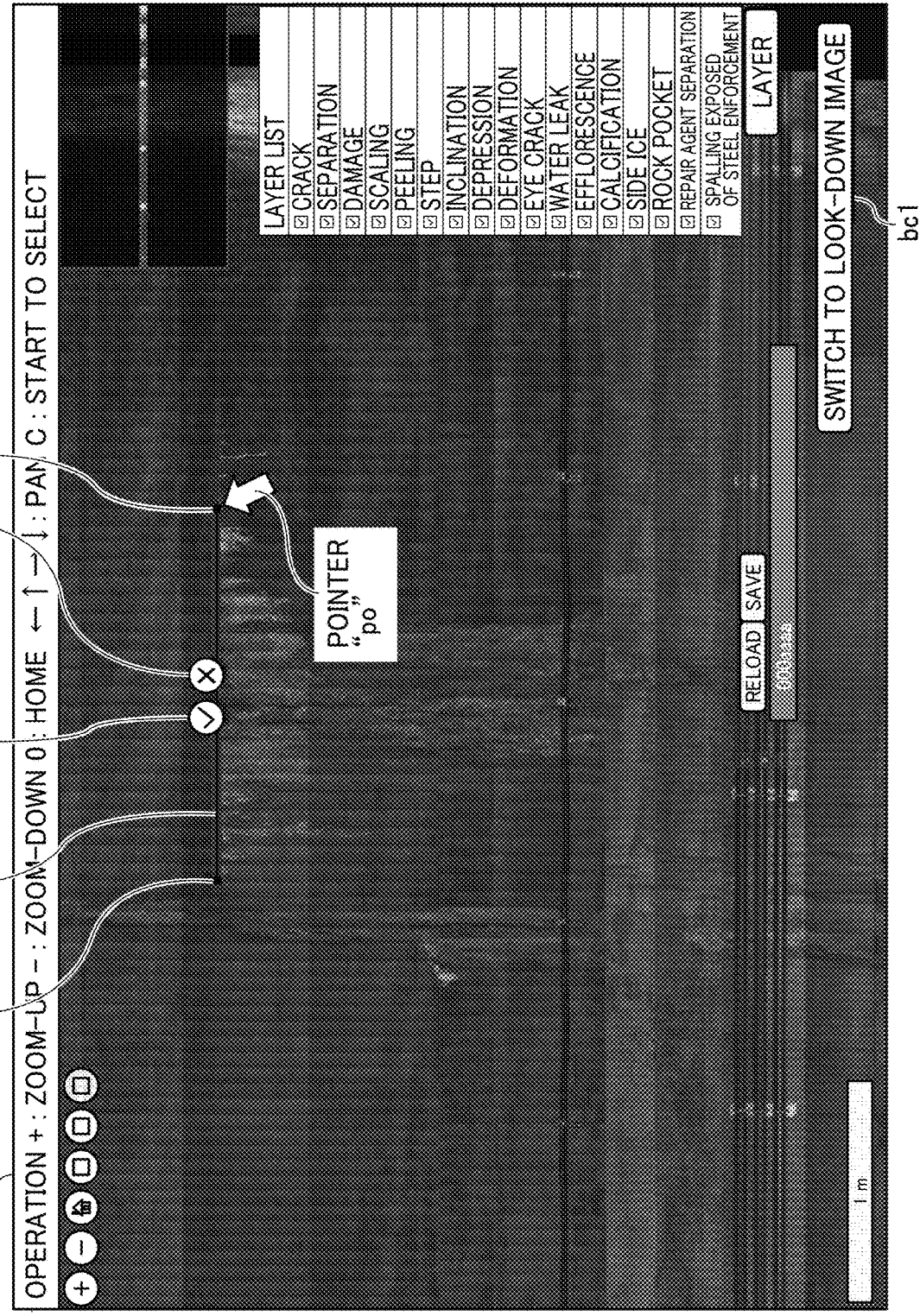
FIG. 17 is an example of a screen when inputting the diagnosis target image in the diagnosis position input screen.

As illustrated in FIG. 17, when the user identifies an end point "p12" of the diagnosis target element image e11 using the pointer "po," the reception unit 32 receives the input of the end point "p12" of the first diagnosis target element image "e11" (step S103).

Then, the display control unit 34 displays the first diagnosis target element image "e11" between the start point "p11" and the end point "p12," and also displays an enter button "co12" and a cancel button "ca12" around the center of the first diagnosis target element image "e11" (step S104) as illustrated in FIG. 17. As described above, the user can draw the diagnosis target element image by identifying the start point and the end point of the diagnosis target element image.

The determination unit 35 determines whether the diagnosis target element image, displayed in step S104, includes a plurality of diagnosis target element images (step S105). At this time, since only one diagnosis target element image is displayed as illustrated in FIG. 17, the determination unit 35 determines that the diagnosis target element image does not include the plurality of diagnosis target element images (step S105: NO), and the sequence proceeds to step S106.

When the determination unit 35 determines that the diagnosis target element image does not include the plurality of diagnosis target element images (step S105: NO), the determination unit 35 determines whether pressing of the enter button is received by the reception unit 32 (step S106). If the determination unit 35 determines that the pressing of the enter button is received by the reception unit 32 (step S106: YES), the sequence proceeds to step S110, to be described later. On the other hand, if the determination unit 35 determines that the pressing of the enter button is not received by the reception unit 32 (step S106: NO), the sequence returns to step S103.

Figure 18:
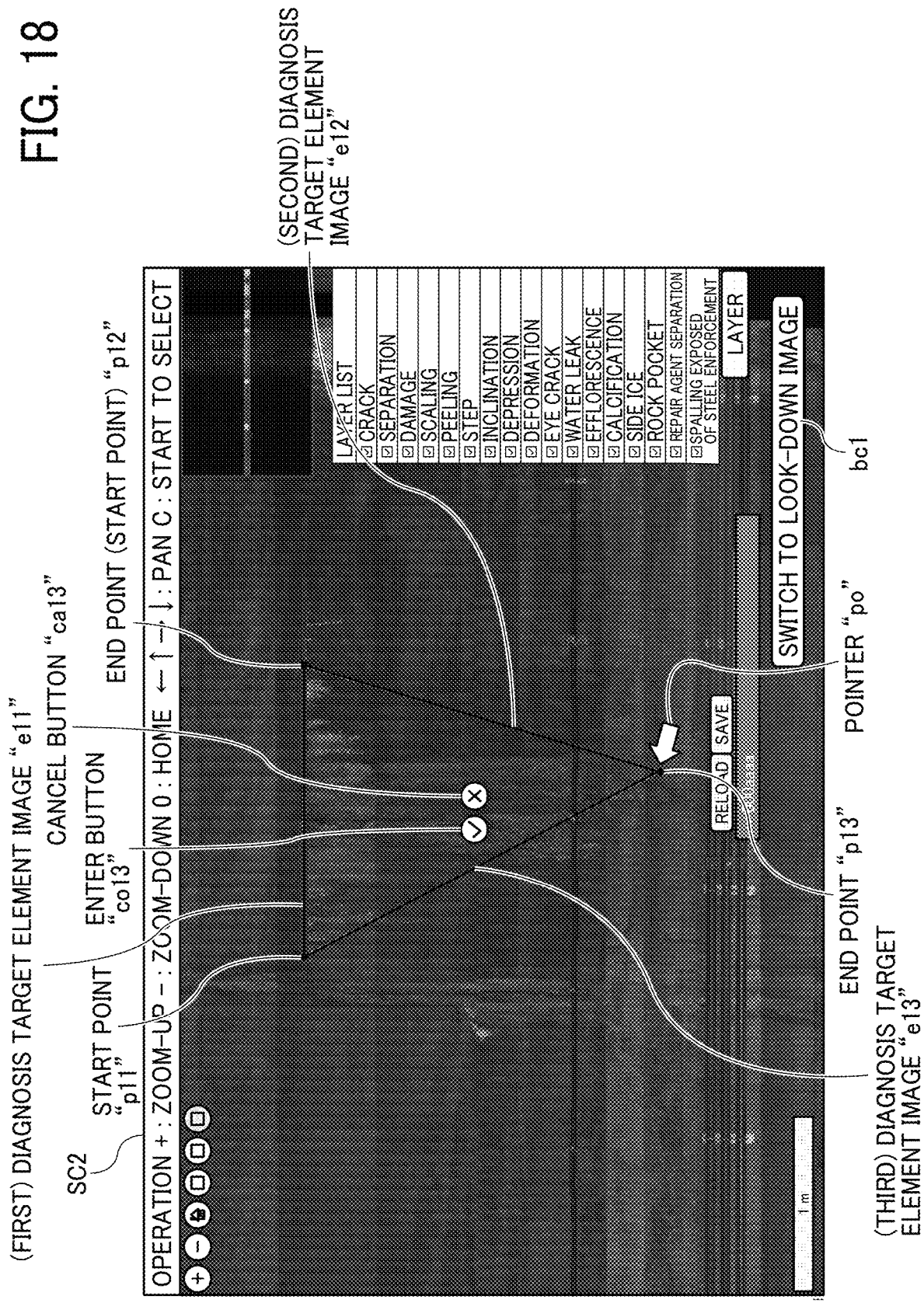
FIG. 18 is an example of a screen when inputting the diagnosis target image in the diagnosis position input screen.

As illustrated in FIG. 18, when the user identifies an end point "p13" of a second diagnosis target element image "e12" using the pointer "po," the reception unit 32 receives the input of an end point "p13" of the second diagnosis target element image "e12." Since the start point of the second diagnosis target element image 12 matches the end point "p12" of the first diagnosis target element image "e11," the user can omit the identification of the start point of the second diagnosis target element image "e12."

Then, in step S104, the display control unit 34 displays the second diagnosis target element image "e12" between the start point (i.e., end point "p12") and the end point "p13," and also displays an enter button "co13" and a cancel button "ca13" between the first diagnosis target element image "e11" and the second diagnosis target element image "e12" as illustrated in FIG. 18.

Then, in step S105, the determination unit 35 determines whether the diagnosis target element image, displayed in step S104, includes a plurality of diagnosis target element images. At this time, since two diagnosis target element images (i.e., the first diagnosis target element image "e11" and the second diagnosis target element image "e12") are displayed as illustrated in FIG. 18, the determination unit 35 determines that plurality of the diagnosis target element images is displayed (step S105: YES).

Then, the display control unit 34 automatically displays a third diagnosis target element image "e13" (i.e., new diagnosis target element image) between the start point "p11" of the first diagnosis target element image "e11" and the end point "p13" of the second diagnosis target element image "e12" as illustrated in FIG. 18 (step S107), in which the third diagnosis target element image "e13" is the latest diagnosis target element image.

Further, the display control unit 34 changes the display positions of the enter button and the cancel button (step S108). Specifically, the display control unit 34 changes the enter button "co12" and the cancel button "ca12" illustrated in FIG. 17 to the enter button "co13" and the cancel button "ca13" illustrated in FIG. 18.

Then, the determination unit 35 determines whether the pressing of the enter button is received by the reception unit 32 (step S109). If the determination unit 35 determines that the pressing of the enter button is not received by the reception unit 32 (step S109: NO), the sequence returns to the above described step S103.

Figure 19:
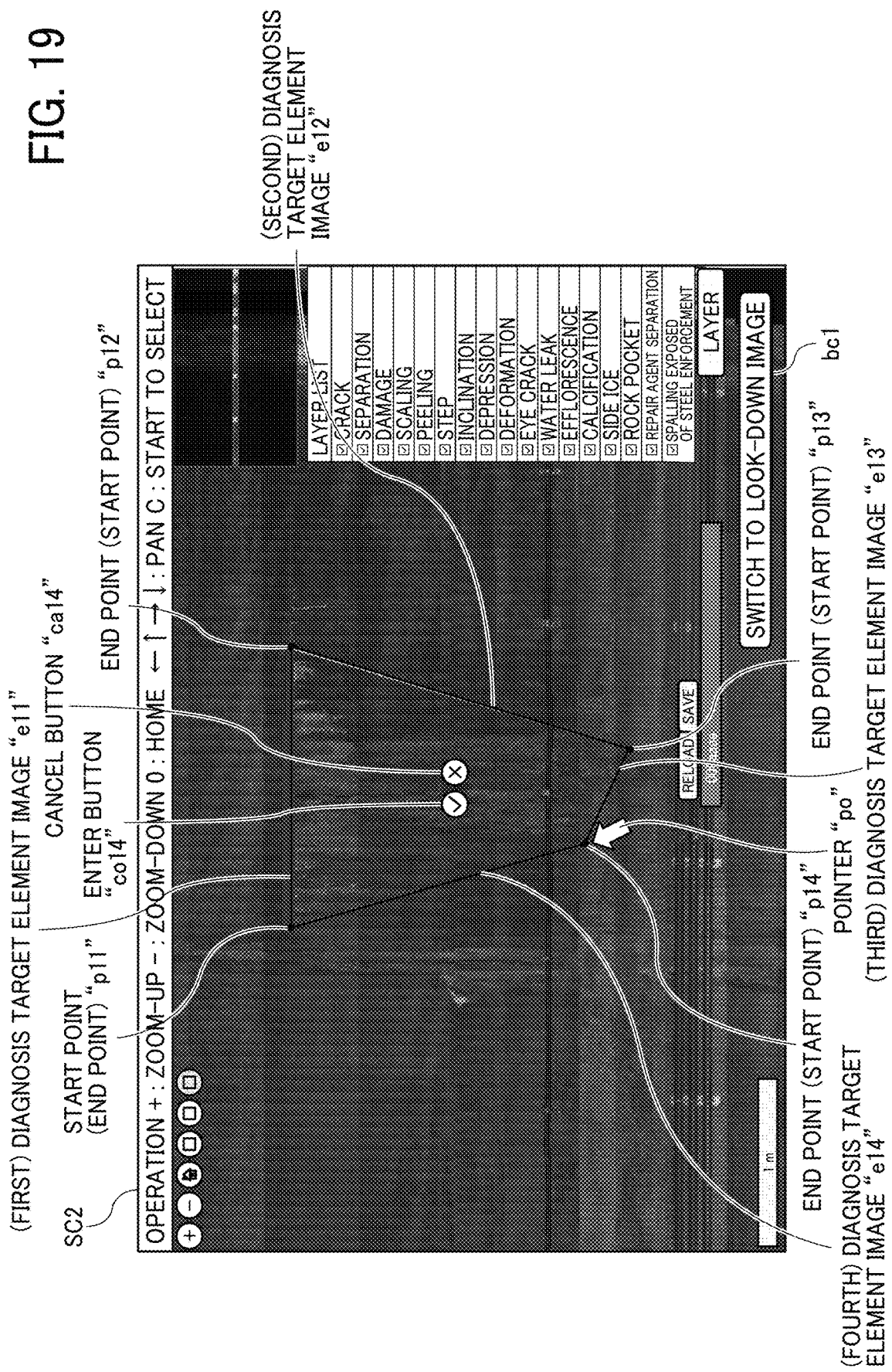
FIG. 19 is an example of a screen when inputting the diagnosis target image in the diagnosis position input screen.

As illustrated in FIG. 19, when the user identifies an end point "p14" of the third diagnosis target element image "e13" using the pointer "po," the reception unit 32 receives the input of the end point "p14" of the third diagnosis target element image "e13." Since the start point of the third diagnosis target element image "e13" matches the end point "p13" of the second diagnosis target element image "e12," the user can omit the identification of the start point of the third diagnosis target element image "e13."

Then, in step S104, the display control unit 34 displays the third diagnosis target element image "e13" between the start point (i.e., end point "p13") and the end point "p14," and also displays an enter button "co14" and a cancel button "ca14" between the first diagnosis target element image "e11, the second diagnosis target element image "e12," and the third diagnosis target element image "e13."

Then, in step S105, the determination unit 35 determines whether the diagnosis target element image, displayed in step S104, includes the plurality of the diagnosis target element images. At this time, since three diagnosis target element images are displayed as illustrated in FIG. 19, the determination unit 35 determines that the diagnosis target element image, displayed in step S104, includes the plurality of the diagnosis target element images (step S105: YES).

Then, in step S107, the display control unit 34 automatically displays a fourth diagnosis target element image "e14" (i.e., new diagnosis target element image) between the start point "p11" of the first diagnosis target element image "e11" and the end point "p14" of the third diagnosis target element image "e13" as illustrated in FIG. 19, in which the fourth diagnosis target element image "e14" is the latest diagnosis target element image.

Further, in step S108, the display control unit 34 changes the display positions of the enter button and the cancel button. Specifically, the display control unit 34 changes the enter button "co13" and the cancel button "ca13" illustrated in FIG. 18 to the enter button "co14" and the cancel button "ca14" illustrated in FIG. 19.

Figure 20:
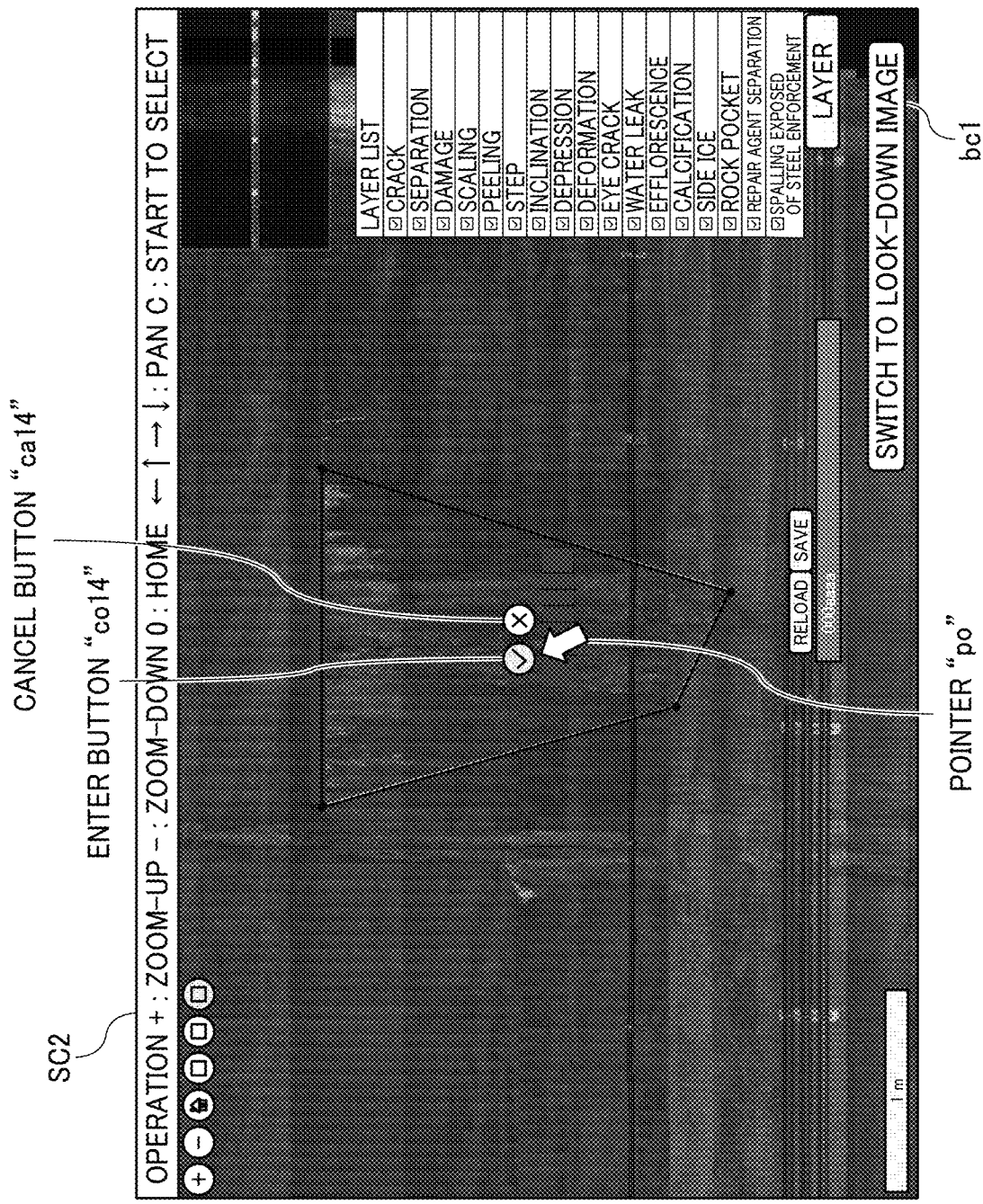
FIG. 20 is an example of a screen when inputting the diagnosis target image in the diagnosis position input screen.

Then, as illustrated in FIG. 20, when the user presses the enter button "co14" using the pointer "po," the reception unit 32 receives the pressing, and the determination unit 35 determines that the pressing of the enter button is received by the reception unit 32 (step S109: YES).

Figure 21:
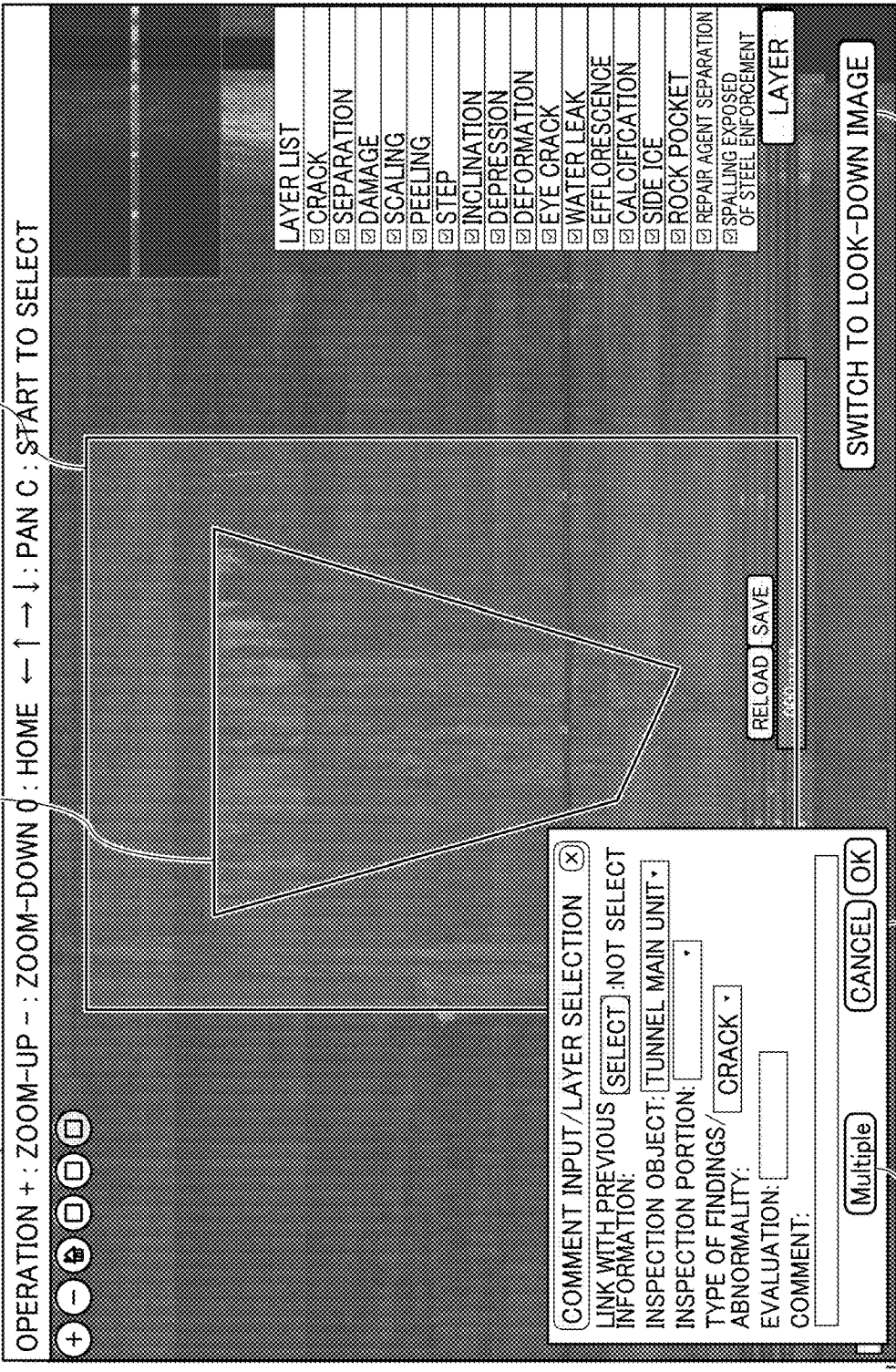
FIG. 21 is an example of a screen when inputting the diagnosis target image in the diagnosis position input screen.

Then, as illustrated in FIG. 21, the determination unit 35 confirms the diagnosis target image (i.e., drawing of area), and the display control unit 34 displays a confirmed diagnosis target image "dt1" (step S110).

Then, as illustrated in FIG. 21, the display control unit 34 displays a rectangular-shaped diagnosis region "da1" including the diagnosis target image "dt1," and a diagnosis information input screen SC3 (step S111). In this case, in order to make the diagnosis information input screen SC3 conspicuous, the display control unit 34 can apply a masking on a portion other than the diagnosis information input screen SC3. In this description, the diagnosis information input screen SC3 may be referred to as the first input screen, and the diagnosis information input screen SC3 and other similar screens can be also referred to as the input screen, the input section, or the input box depending on purposes of the screens, in which the size of screen may be set smaller than a size of the display 308.

The user, such as the operator, uses the diagnosis information input screen SC3 to input the diagnosis information by referring to the detail information of inspection findings recorded by the inspector or the assistant. As illustrated in FIG. 21, the diagnosis information input screen SC3 displays, for example, a selection button to link with the previous or past diagnosis information, a first pull-down menu for selecting an inspection object, a second pull-down menu for selecting an inspection portion, a third pull-down menu for selecting a type of observed-inspection findings and abnormality, a first input field for inputting an evaluation result, and a second input field for inputting the detail information of inspection findings.

The link with the previous or past diagnosis information is used when adding a new diagnosis target image in the already confirmed diagnosis region. For example, the link with the previous or past diagnosis information can be used when water leakage is already confirmed as one diagnosis target image in one diagnosis region, and then crack is added as a new diagnosis image in the one diagnosis region including the water leakage. Further, as illustrated in FIG. 21, the diagnosis information input screen SC3 displays "OK" button for confirming the input diagnosis information, and "CANCEL" button for canceling the input diagnosis information. The diagnosis information can be also referred to as the assessment information.

In this case, when the user selects and inputs the diagnosis information in the diagnosis information input screen SC3 and presses the "OK" button, the reception unit 32 receives the selection and the input of the diagnosis information (step S112).

Further, as illustrated in FIG. 21, the diagnosis information input screen SC3 displays an input switching button "bm" for switching from the diagnosis information input screen SC3 to a diagnosis information input screen SC4 illustrated in FIG. 22. When the input switching button "bm" (FIG. 21) is pressed, the display control unit 34 switches the diagnosis information input screen SC3 to the diagnosis information input screen SC4 (FIG. 22).

The diagnosis information input screen SC4 is used when one diagnosis region includes a plurality of diagnosis target images, and the diagnosis information is input for each one of the diagnosis target images. For example, when one diagnosis region includes three diagnosis target images (e.g. cracks, calcifications, water leaks), the diagnosis information input screen SC4 is used to collectively manage the one diagnosis region including the three diagnosis target images. In this case, when data of the diagnosis information is uploaded from the diagnosis processing terminal 3 to the diagnosis management server 5 at a later time, the diagnosis management server 5 manages the three diagnosis target images (e.g., cracks, calcifications, and water leaks) included in the same diagnosis region having the diagnosis region number of "3" as illustrated in FIG. 5.

Similar to the diagnosis information input screen SC3, the diagnosis information input screen SC4 displays "OK" button for confirming the input diagnosis information, and "CANCEL" button for canceling the input diagnosis information as illustrated in FIG. 22. Further, as illustrated in FIG. 22, the diagnosis information input screen SC4 displays an input switching button "bs" for switching from the diagnosis information input screen SC4 to the diagnosis information input screen SC3 (FIG. 21). When the input switching button "bs" (FIG. 22) is pressed, the display control unit 34 switches the diagnosis information input screen SC4 (FIG. 22) to the diagnosis information input screen SC3 (FIG. 21).

By performing the above described processing, the drawing of the diagnosis target image "dt1" and the diagnosis region "da1" and the selection and the input of the diagnosis information are completed for the first input mode of the diagnosis target image (i.e., drawing of an area).

Input Mode of Diagnosis Target Image (Drawing of Line Pattern):

Hereinafter, a description is given of the detail of step S24 (FIG. 10) when the second input mode for inputting a line pattern of the diagnosis target image (i.e., drawing of a line pattern) is selected with reference to FIGS. 12, and 23 to 28. The second input mode for inputting the line pattern of the diagnosis target image (i.e., drawing of a line pattern) can be referred to as the second input mode of the diagnosis target image in this description. The second input mode of the diagnosis target image (i.e., drawing of a line pattern) is typically used when the diagnosis target is crack.

Figure 12:
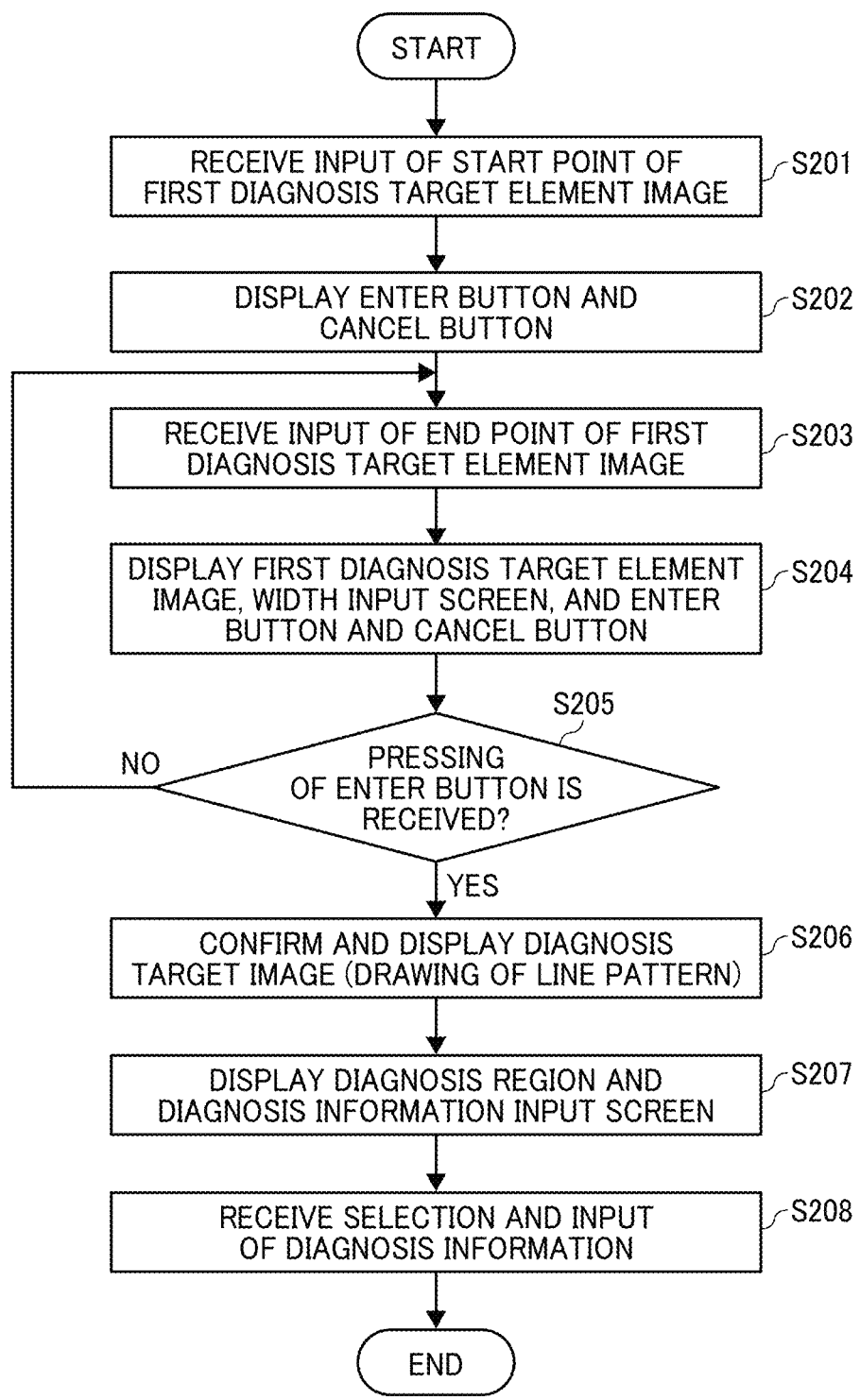
FIG. 12 is an example of a flowchart illustrating processing of a second input mode of a diagnosis target image (e.g., drawing of a line pattern)
Figure 23:
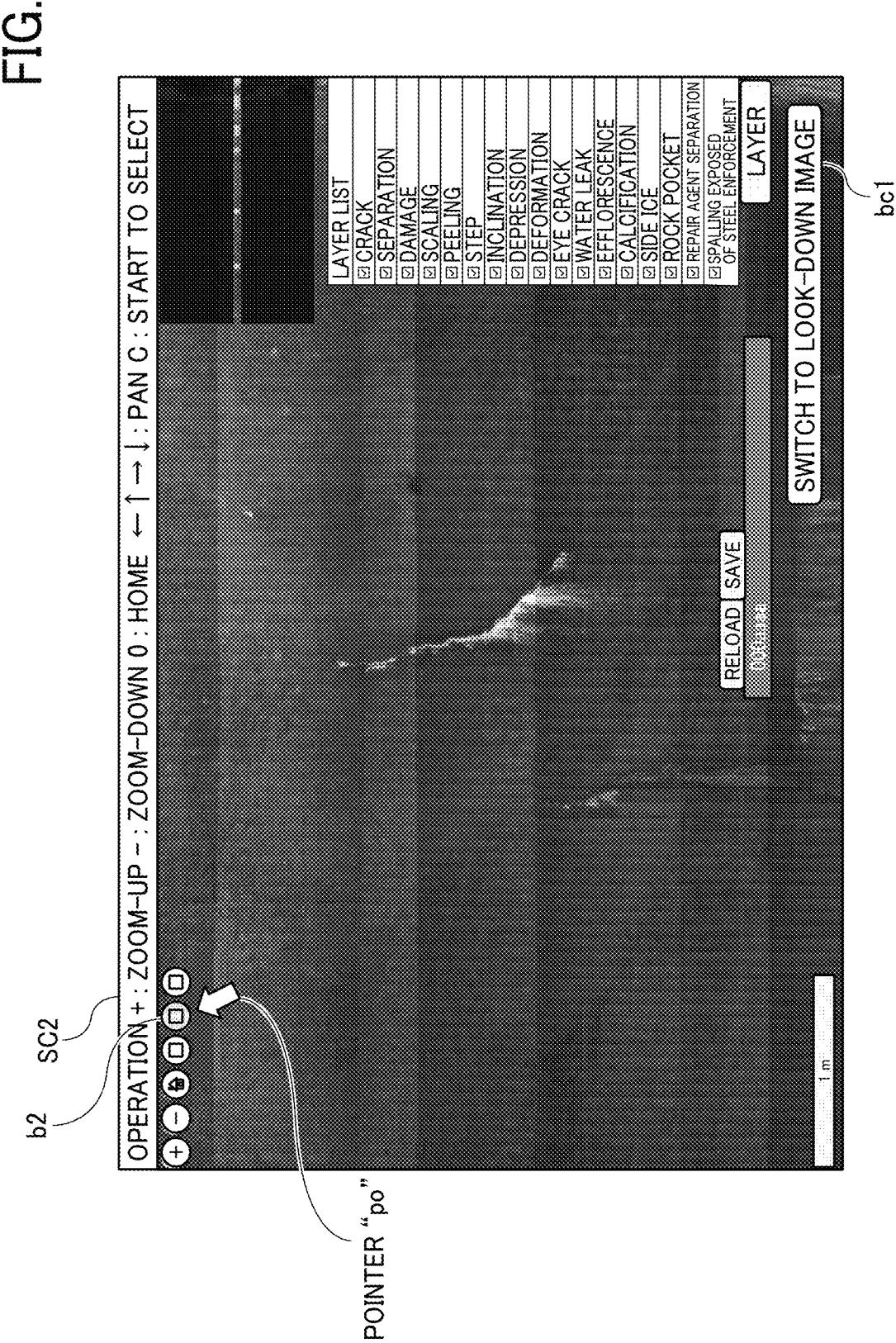
FIG. 23 is an example of another screen when inputting the diagnosis target image (e.g., drawing of a line pattern) in the diagnosis position input screen.

FIG. 12 is an example of a flowchart illustrating processing of the second input mode of the diagnosis target image (i.e., drawing of a line pattern). FIG. 23 is an example of the diagnosis position input screen SC2 when the second input mode of the diagnosis target image (i.e., drawing of a line pattern) is selected. FIGS. 24 to 28 are examples of the diagnosis position input screen SC2 when inputting the diagnosis target image (i.e., drawing of a line pattern) on the diagnosis position input screen SC2.

At first, in step S23 (FIG. 10), when the user selects the selection button "b2" using the pointer "po," the display control unit 34 sets the second input mode of the diagnosis target image (i.e., drawing of a line pattern) as illustrated in FIG. 23.

Figure 24:
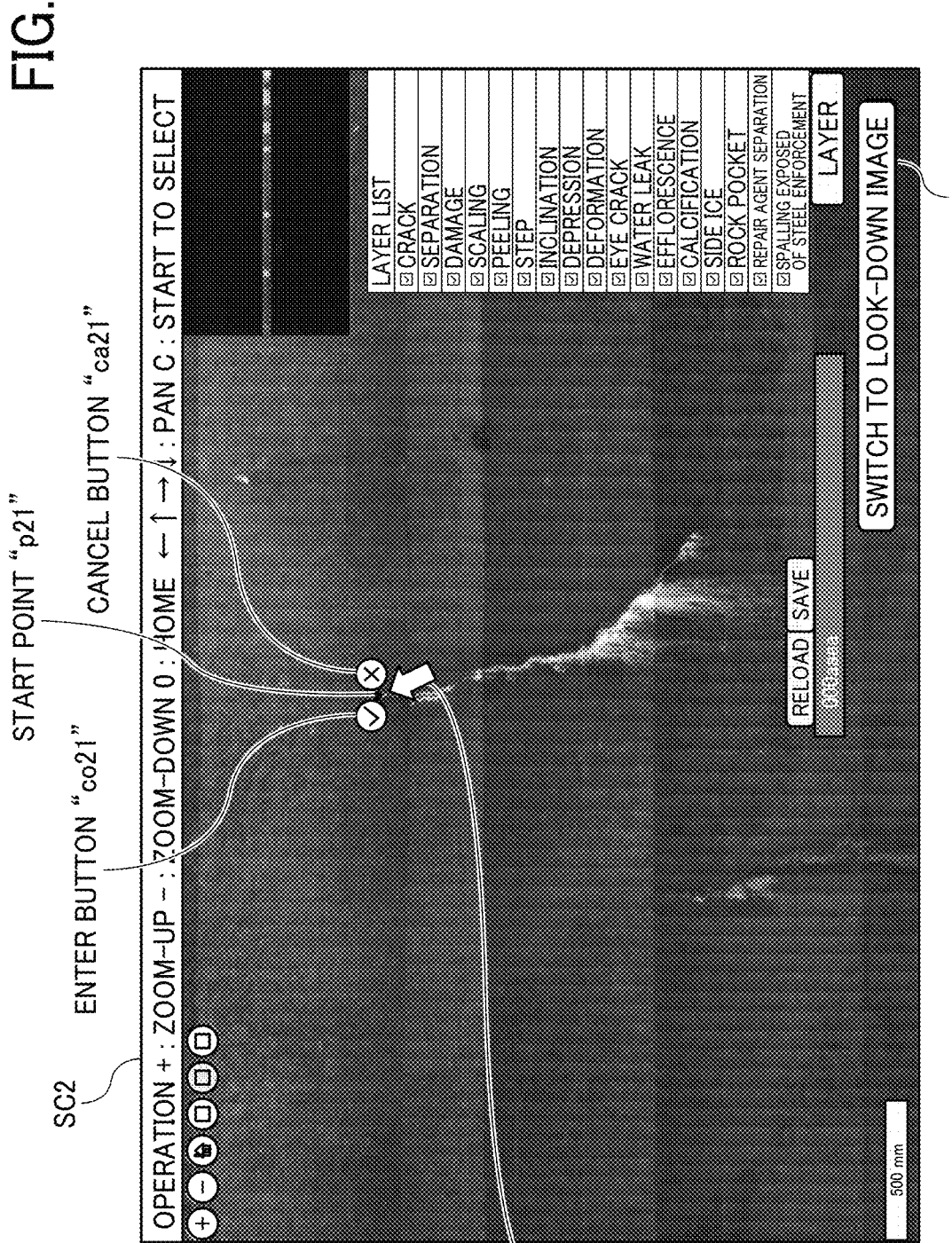
FIG. 24 is an example of another screen when inputting the diagnosis target image (e.g., drawing of a line pattern) in the diagnosis position input screen.

Then, as illustrated in FIG. 24, when the user identifies a start point "p21" of a first diagnosis target element image "e21" using the pointer "po," the reception unit 32 receives the input of the start point "p21" of the first diagnosis target element image "e21" (step S201).

Then, the display control unit 34 displays an enter button "co21" and a cancel button "ca 21" around the start point "21" (step S202).

Figure 25:
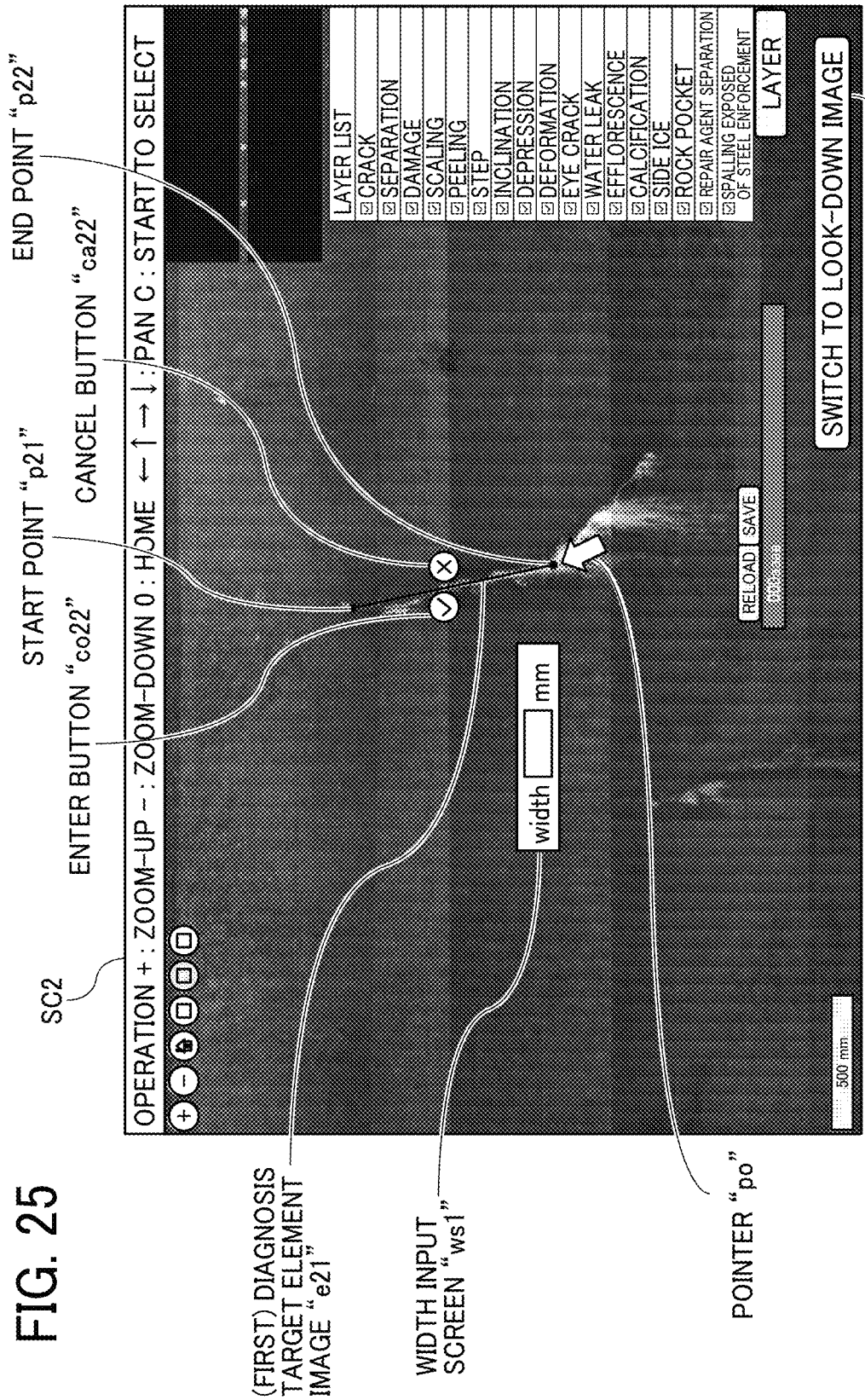
FIG. 25 is an example of another screen when inputting the diagnosis target image (e.g., drawing of a line pattern) in the diagnosis position input screen.
Figure 26:
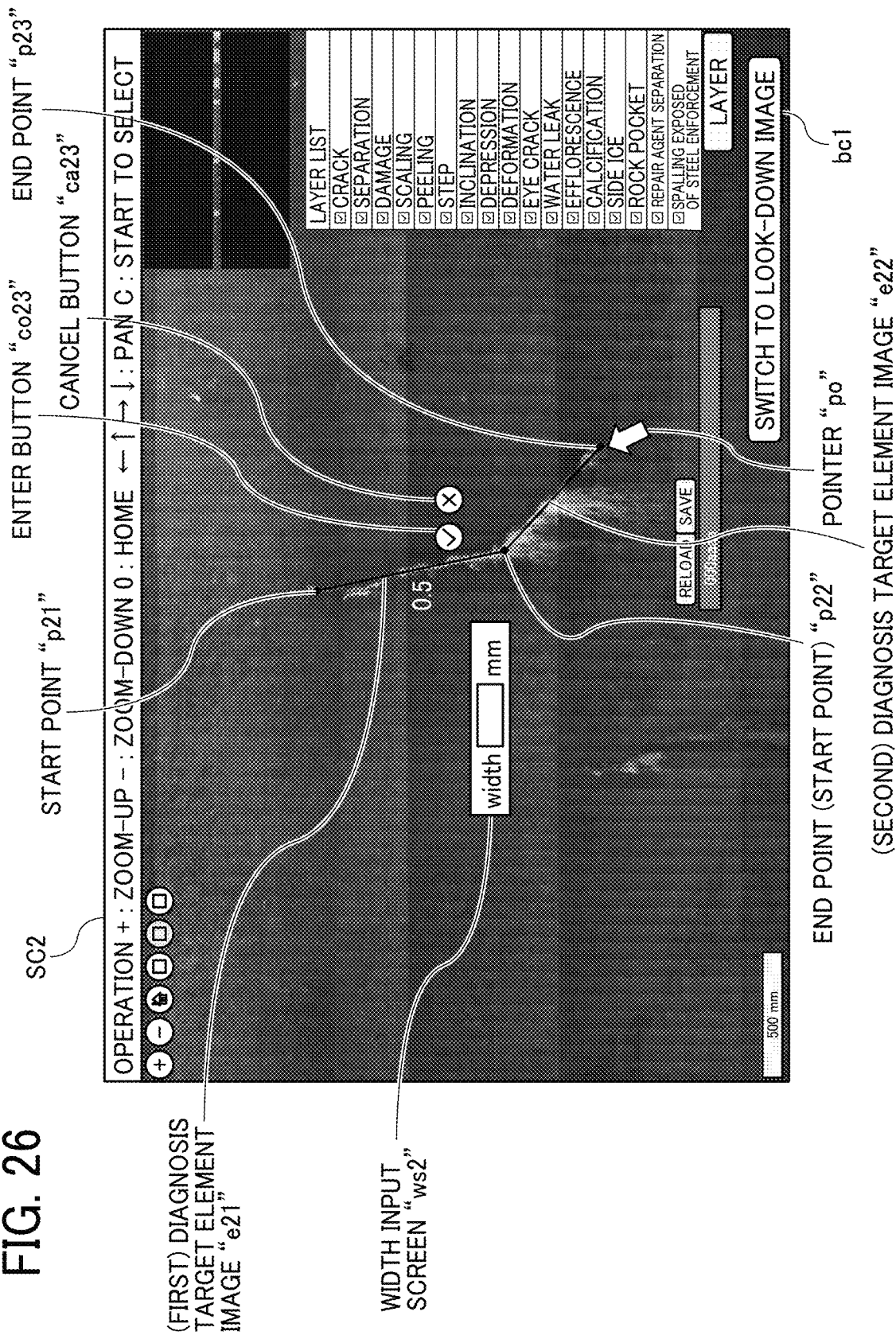
FIG. 26 is an example of another screen when inputting the diagnosis target image (e.g., drawing of a line pattern) in the diagnosis position input screen.

As illustrated in FIG. 25, when the user identifies an end point "p22" of the first diagnosis target element image "e21" using the pointer "po," the reception unit 32 receives the input of the end point "p22" of the first diagnosis target element image "e21" (step S203).

Then, the display control unit 34 displays the diagnosis target element image "e21" and a width input screen "ws1" between the start point "p21" and the end point "p22," and also displays an enter button "co22" and a cancel button "ca22" around the center of the first diagnosis target element image "e21" (step S204). As described above, the user can draw the diagnosis target element image by identifying the start point and the end point.

The width input screen "ws1" is used for inputting a width of the line pattern when the diagnosis target element is crack. The width input screen "ws1" is displayed near the first diagnosis target element image "e21" between the start point "p21" and the end point "p22." The user inputs a value of width in the width input screen "ws1" by referring to the numerical value in the development-view image 201 (e.g., numeral value written by a special chalk) and the detail information of inspection findings. When the user inputs the numerical value in the width input screen "ws1," the reception unit 32 receives the input numerical value, and the display control unit 34 displays the input numerical value (e.g., "0.5") as illustrated in FIG. 26.

Then, the determination unit 35 determines whether the pressing of the enter button is received by the reception unit 32 (step S205). If the determination unit 35 determines that the pressing of the enter button is not received by the reception unit 32 (step S205: NO), the sequence returns to step S203.

In FIG. 26, when the user identifies an end point "p23" of a second diagnosis target element image "e22" using the pointer "po," the reception unit 32 receives the input of the end point "p23" of the second diagnosis target element image "e22." Since the start point of the second diagnosis target element image "e22" matches the end point "p22" of the first diagnosis target element image "e21," the user can omit the identification of the start point of the second diagnosis target element image "e22."

Figure 27:
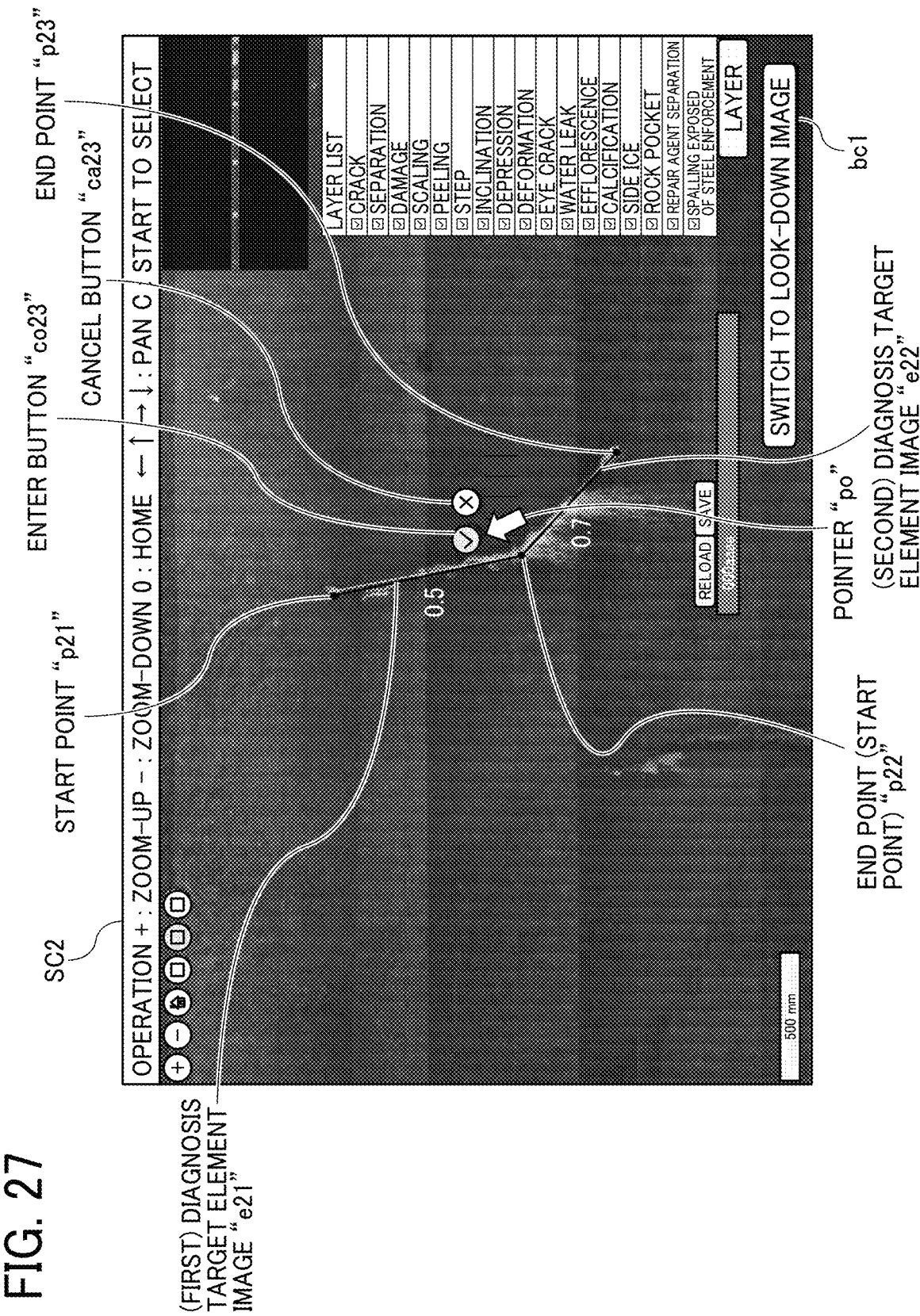
FIG. 27 is an example of another screen when inputting the diagnosis target image (e.g., drawing of a line pattern) in the diagnosis position input screen.

Then, in step S204, the display control unit 34 displays the second diagnosis target element image "e22" and a width input screen "ws2" between the start point (i.e., end point "p22") and the end point "p23," and also displays an enter button "co23" and a cancel button "ca23" between the first diagnosis target element image "e21" and the second diagnosis target element image "e22" as illustrated in FIG. 26. When the user inputs a numerical value into the width input screen "ws2," the reception unit 32 receives the input numerical value, and the display control unit 34 displays the input numerical value (e.g., "0.7") as illustrated in FIG. 27. In this description, the width input screen may be referred to as the second input screen. Further, if the diagnosis target element image is an image having a given area size, an area size input screen can be set.

As illustrated in FIG. 27, when the user presses the enter button "co23" using the pointer "po," the reception unit 32 receives the pressing, and the determination unit 35 determines that the pressing of the enter button is received by the reception unit 32 (step S205: YES).

Figure 28:
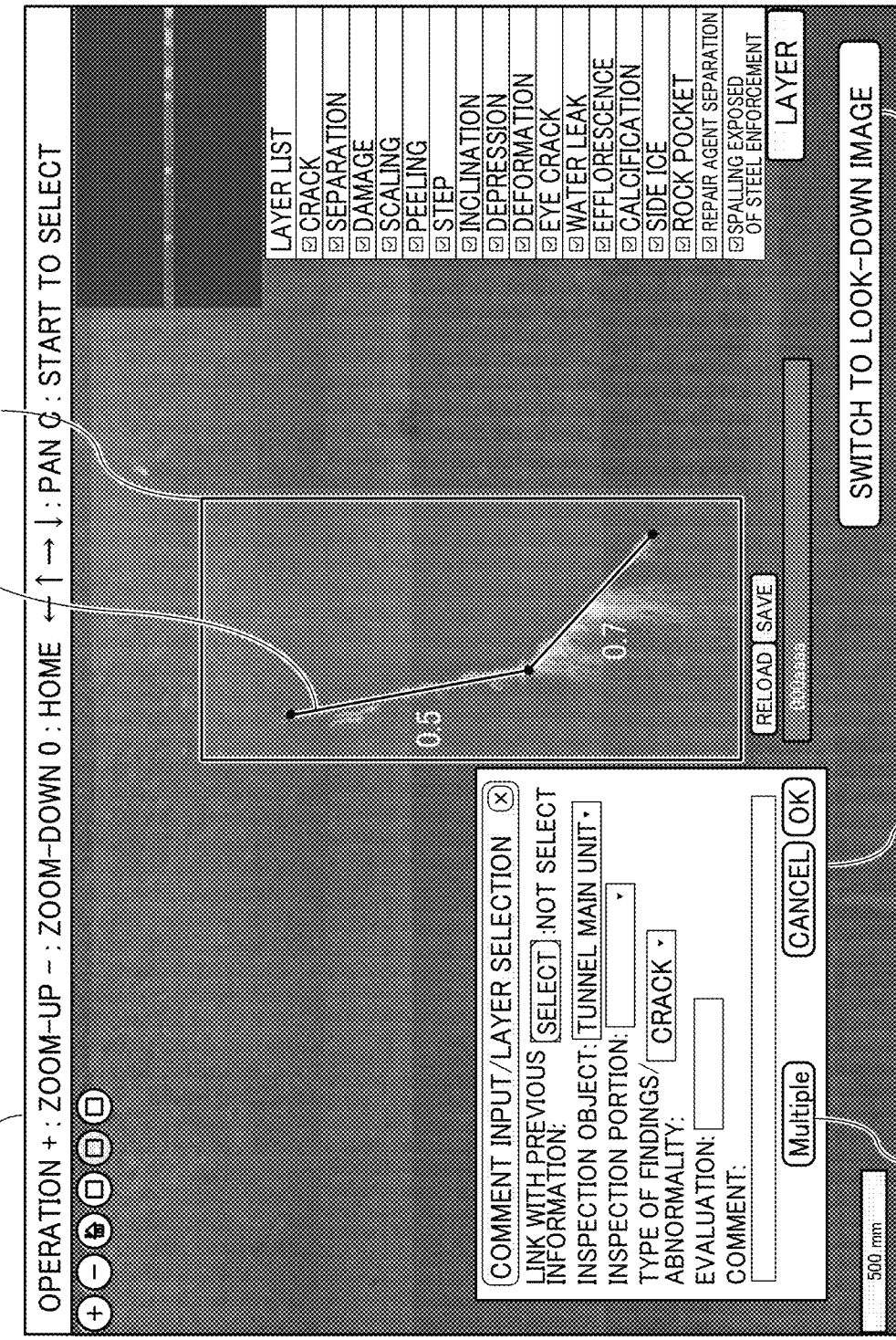
FIG. 28 is an example of another screen when inputting the diagnosis target image (e.g., drawing of a line pattern) in the diagnosis position input screen.

Then, the determination unit 35 confirms the diagnosis target image (i.e., drawing of a line pattern), and the display control unit 34 displays a confirmed diagnosis target image "dt2" (step S206) as illustrated in FIG. 28.

Further, the display control unit 34 displays a rectangular-shaped diagnosis region "da2" including the diagnosis target image "dt2," and the diagnosis information input screen SC3 (step S207). In this case, in order to make the diagnosis information input screen SC3 conspicuous, the display control unit 34 can apply a masking on a portion other than the diagnosis information input screen SC3.

When the user selects and inputs the diagnosis information in the diagnosis information input screen SC3, and presses the "OK" button, the reception unit 32 receives the selection and input of the diagnosis information (step S208).

By performing the above described processing, the drawing of the diagnosis target image "dt2" and the diagnosis region "da2" and the selection and the input of the diagnosis information are completed for the second input mode of the diagnosis target image (i.e., drawing of line pattern).

Input Mode of Diagnosis Region:

Hereinafter, a description is given of the detail of step S24 (FIG. 10) when the third input mode of the diagnosis region is selected with reference to FIGS. 13, and 29 to 33. The third input mode of the diagnosis region is used when the diagnosis target image is identified after identifying the diagnosis region in this description.

Figure 13:
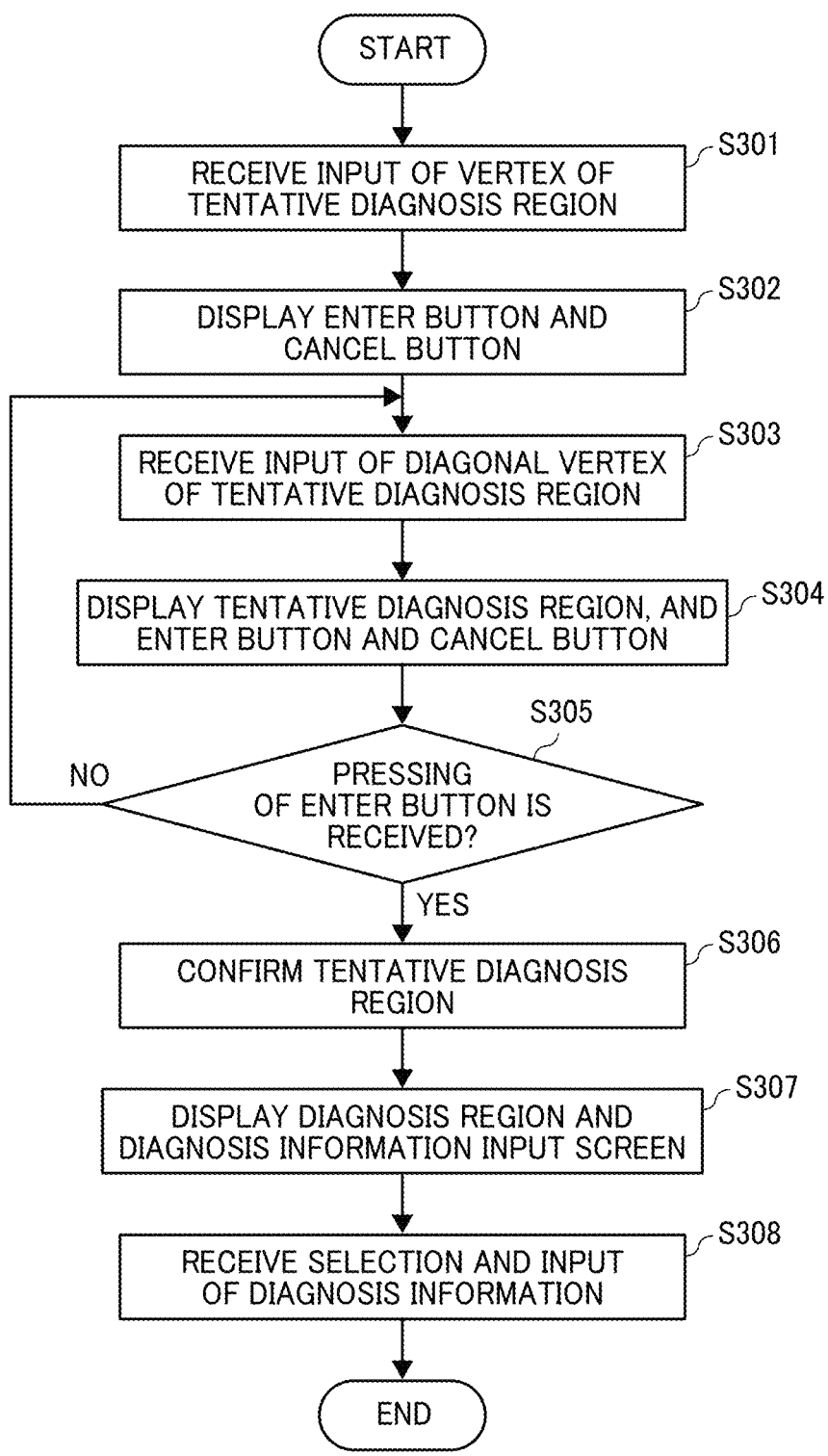
FIG. 13 is an example of a flowchart illustrating processing of a third input mode of a diagnosis region.
Figure 29:
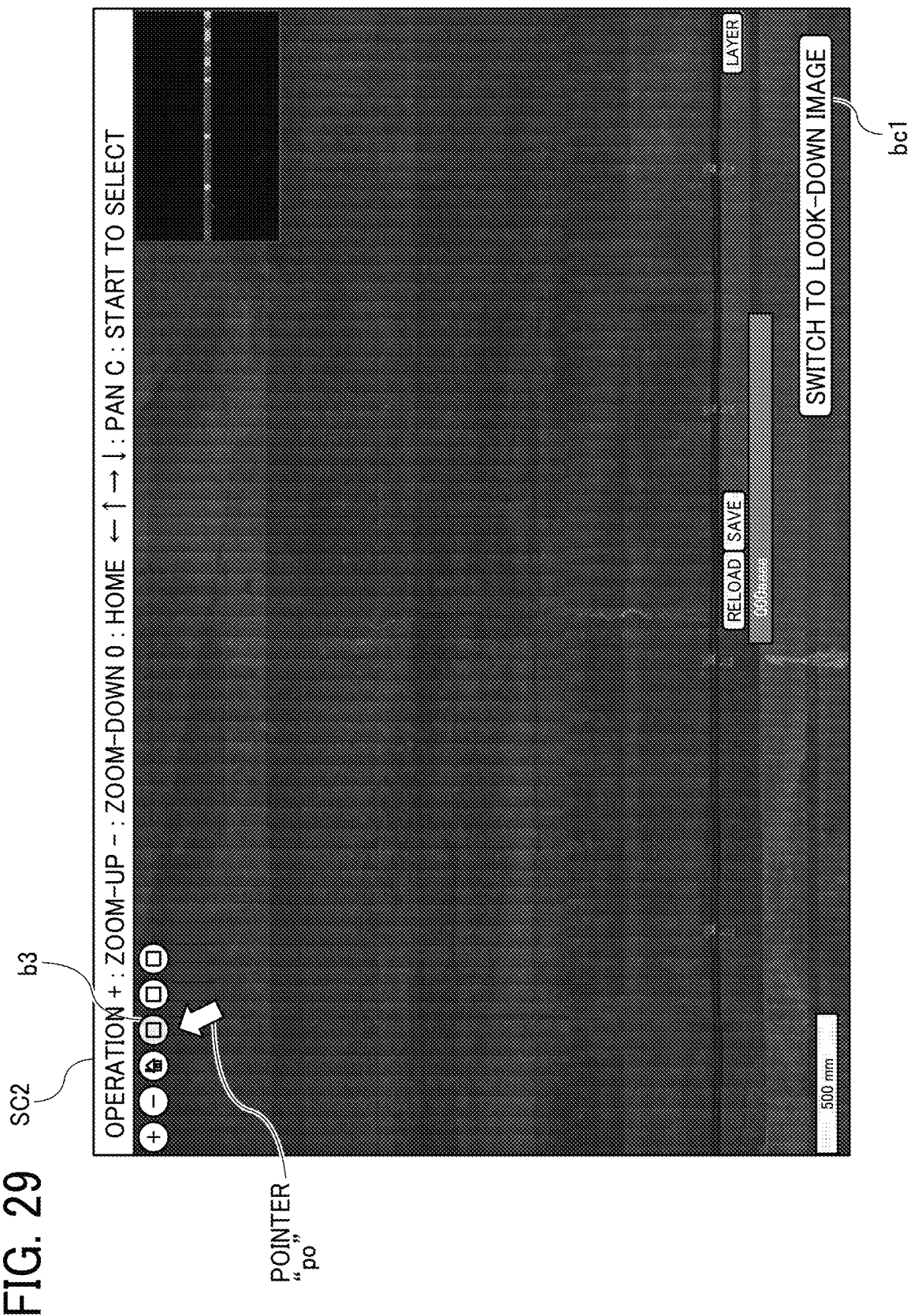
FIG. 29 is an example of another screen when inputting a diagnosis region in a diagnosis position input screen.

FIG. 13 is an example of a flowchart illustrating the steps of processing of the third input mode of the diagnosis region. FIG. 29 is an example of the diagnosis position input screen SC2 when the third input mode of the diagnosis region is selected. FIGS. 30 to 33 are examples of the diagnosis position input screen SC2 for inputting the diagnosis region.

At first, in step S23 (FIG. 10), when the user selects the selection button "b3" using the pointer "po," the display control unit 34 sets the third input mode of the diagnosis region as illustrated in FIG. 29.

Figure 30:
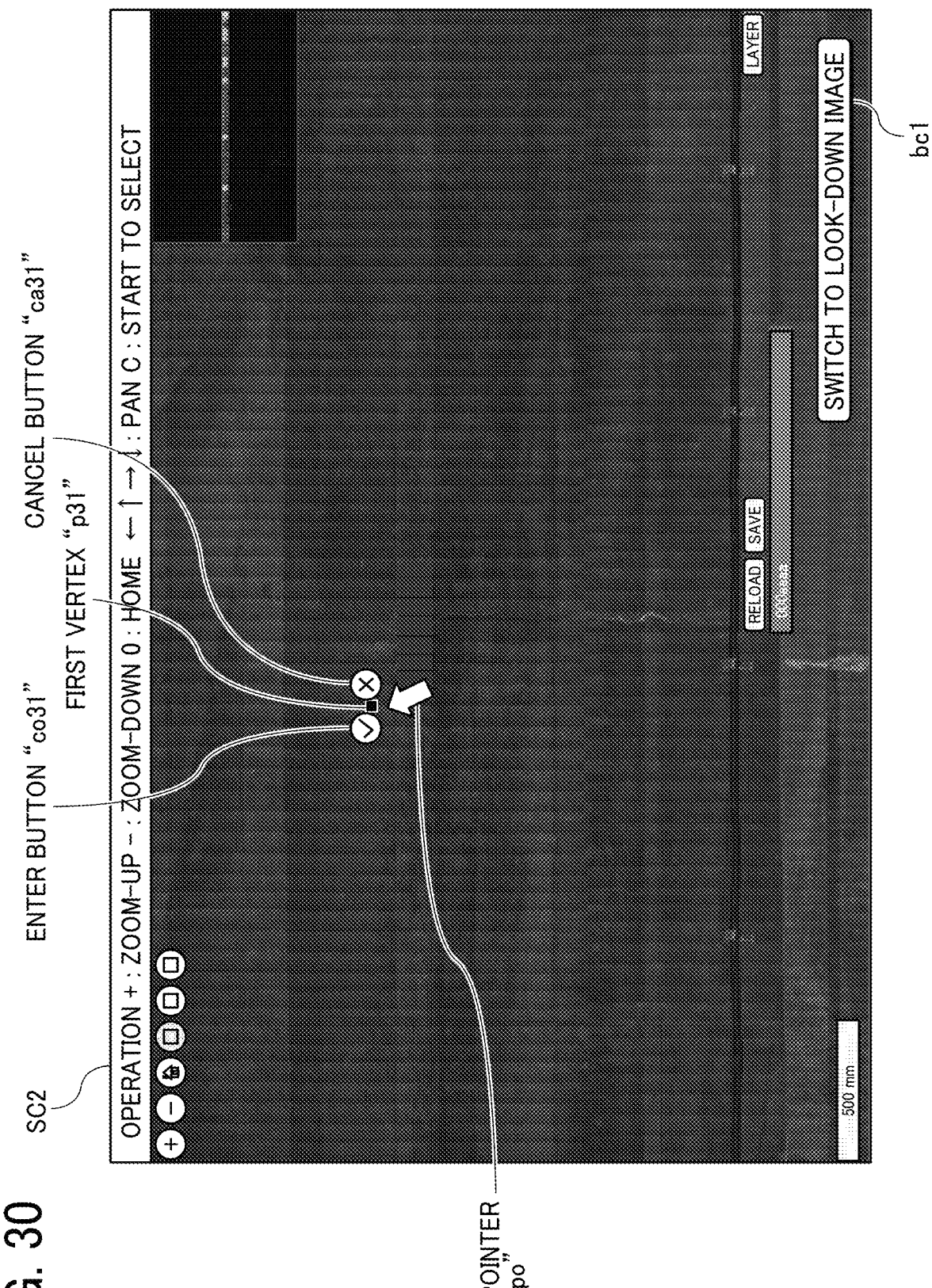
FIG. 30 is an example of another screen when inputting a diagnosis region in a diagnosis position input screen.

Then, as illustrated in FIG. 30, when the user identifies a first vertex "p31" of a tentative diagnosis region "da03" using the pointer "po," the reception unit 32 receives the input of the first vertex "p31" of the tentative diagnosis region "da03" (step S301).

Then, the display control unit 34 displays an enter button "co31" and a cancel button "ca 31" around the first vertex "p31" (step S302) as illustrated in FIG. 30.

Figure 31:
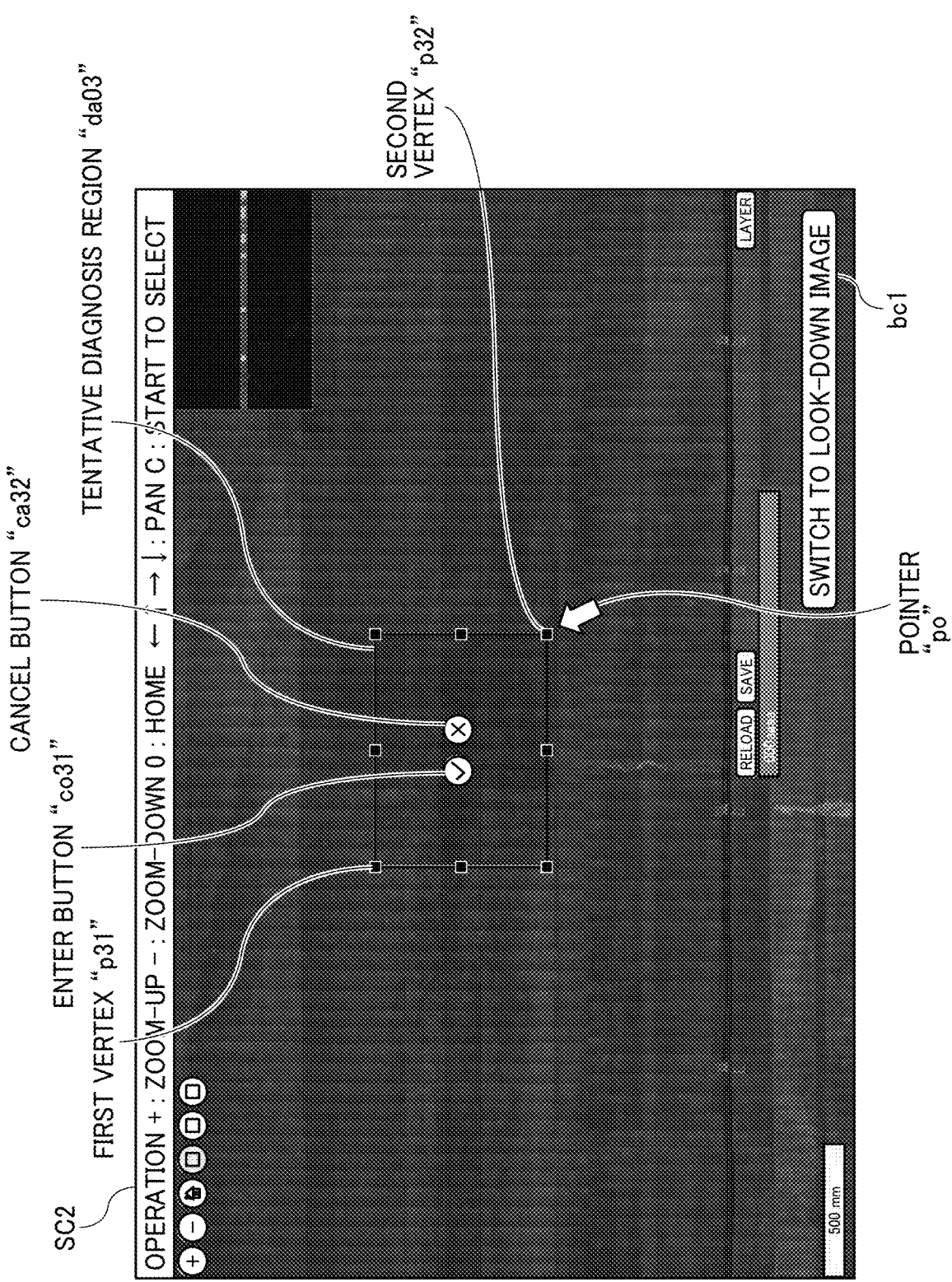
FIG. 31 is an example of another screen when inputting a diagnosis region in a diagnosis position input screen.

Then, as illustrated in FIG. 31, when the user identifies a second vertex "p32," which is a diagonal vertex with respect to the first vertex "p31" of the tentative diagnosis region "da03," using the pointer "po," the reception unit 32 receives the input of the second vertex "p32" as the diagonal vertex of the first vertex "p31" of the tentative diagnosis region "da03" (step S303).

Then, as illustrated in FIG. 31, the display control unit 34 displays the tentative diagnosis region "da03" as a rectangular shape having the first vertex "p31" and the second vertex "p32" as the diagonal vertexes, and also displays an enter button "co32" and a cancel button "ca32" around the center of the tentative diagnosis region "da03" (step S304). As above described, the user can draw the diagnosis region by identifying the two vertexes, each being the diagonal angles.

Then, the determination unit 35 determines whether the pressing of the enter button is received by the reception unit 32 (step S305). If the determination unit 35 determines that the pressing of the enter button is not received by the reception unit 32 (step S305: NO), the sequence returns to step S303. In this case, after the user has identified the second vertex "p32," the first vertex "p31" or the second vertex "p32" is changed to enlarge or reduce the area of the tentative diagnosis region "da03."

Figure 32:
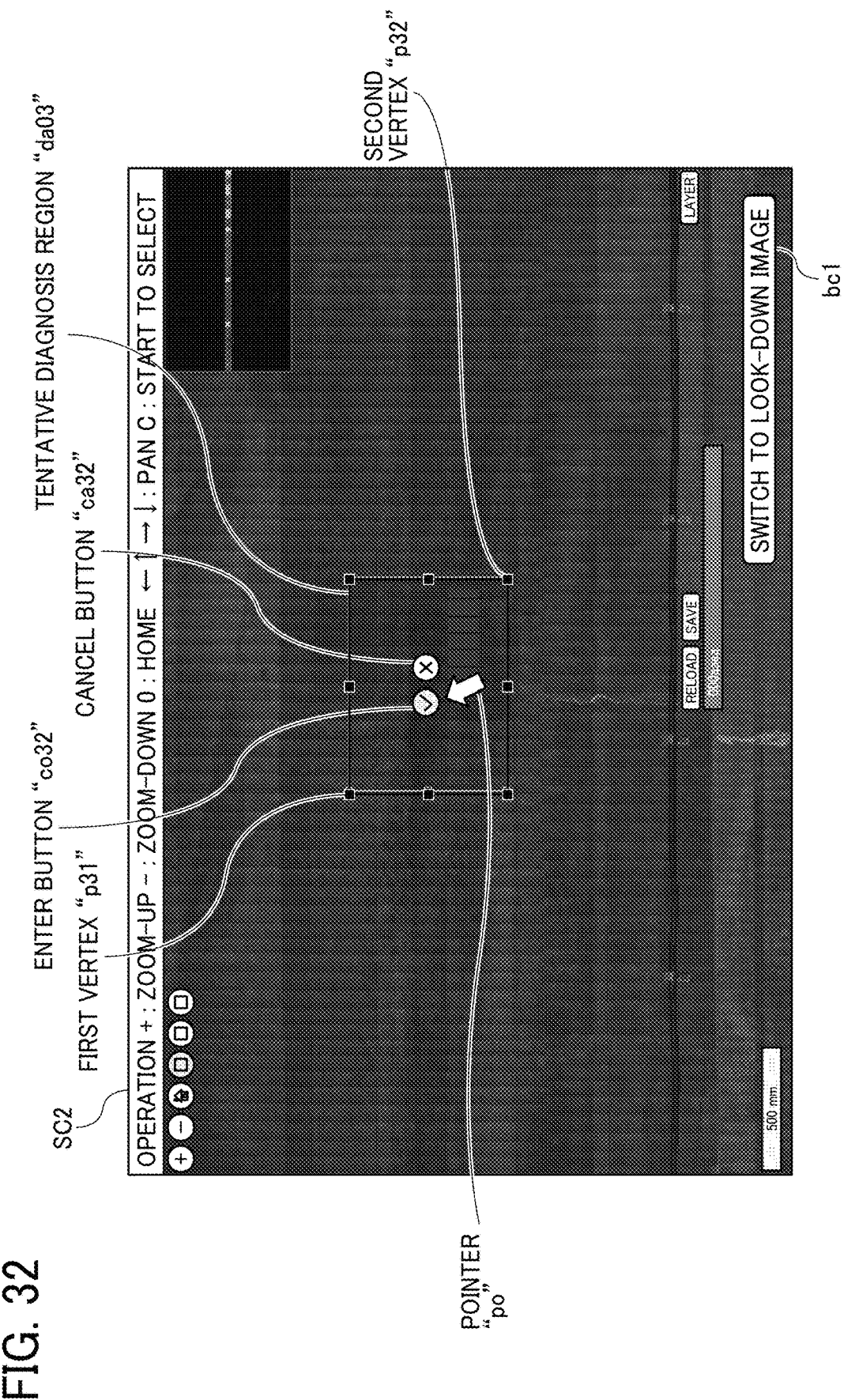
FIG. 32 is an example of another screen when inputting a diagnosis region in a diagnosis position input screen.

On the other hand, as illustrated in FIG. 32, when the user presses the enter button "co32" using the pointer "po," the reception unit 32 receives the pressing of the enter button "co32," and the determination unit 35 determines that the pressing of the enter button is received by the reception unit 32 (step S305: YES).

Then, the determination unit 35 confirms the tentative diagnosis region "da03" (step S306) as a diagnosis region "da3."

Figure 33:
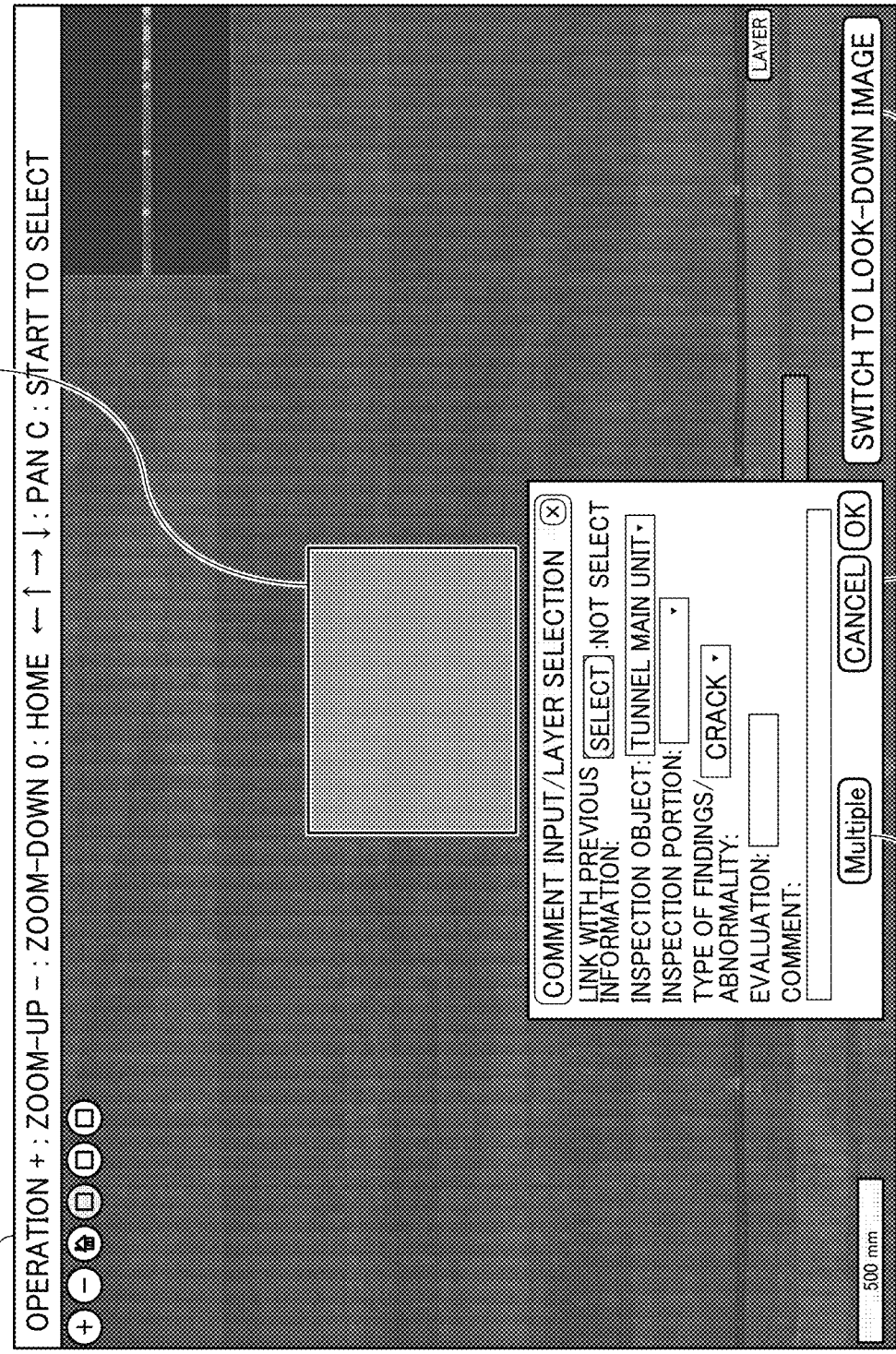
FIG. 33 illustrates a screen example of inputting a diagnosis region in a diagnosis position input screen.

As illustrated in FIG. 33, the display control unit 34 displays the diagnosis region "da3" having a rectangular shape, which is the same as the confirmed tentative diagnosis region "da03," and the diagnosis information input screen SC3 (step S307). In this case, in order to make the diagnosis information input screen SC3 conspicuous, the display control unit 34 can apply a masking on a portion other than the diagnosis information input screen SC3.

When the user selects and inputs the diagnosis information in the diagnosis information input screen SC3, and presses the "OK" button, the reception unit 32 receives the selection and the input of the diagnosis information (step S308).

By performing the above described processing, the drawing of the diagnosis region "da3" and the selection and input of the diagnosis information are completed for the third input mode of the diagnosis region. Thereafter, as similar to the first input mode of the diagnosis target image (i.e., drawing of an area) and the second input node of the diagnosis target image (i.e., drawing of a line pattern), the user can draw the diagnosis target image in the diagnosis region "da3."

Change of Viewing Direction

Figure 34A:
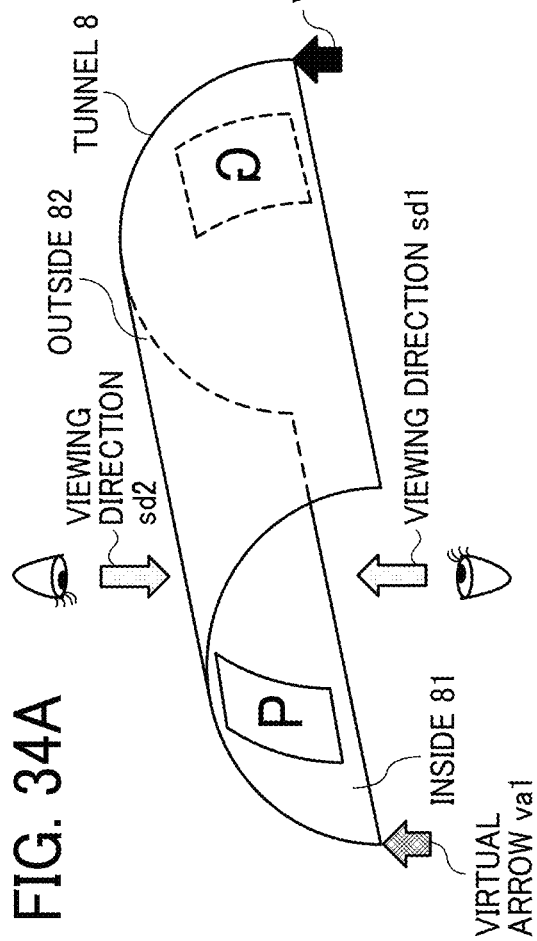
FIG. 34A illustrates a relationship between a tunnel and a viewing direction.
Figure 34C:
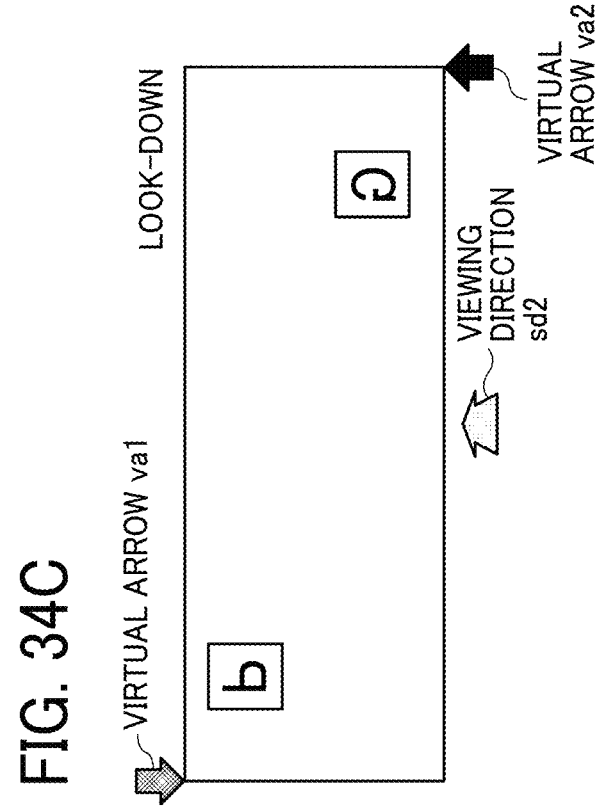
FIG. 34C illustrates a schematic diagram of the tunnel viewed from an upper direction of the tunnel.
Figure 34B:
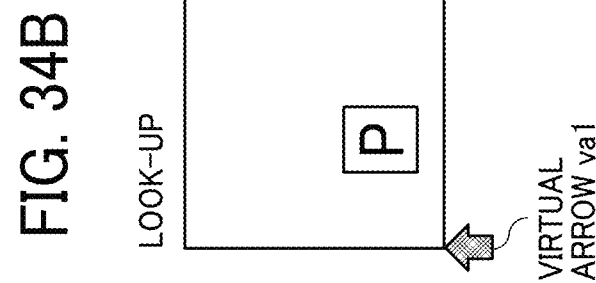
FIG. 34B illustrates a schematic diagram of the tunnel viewed from a lower direction of the tunnel.
Figure 35A:
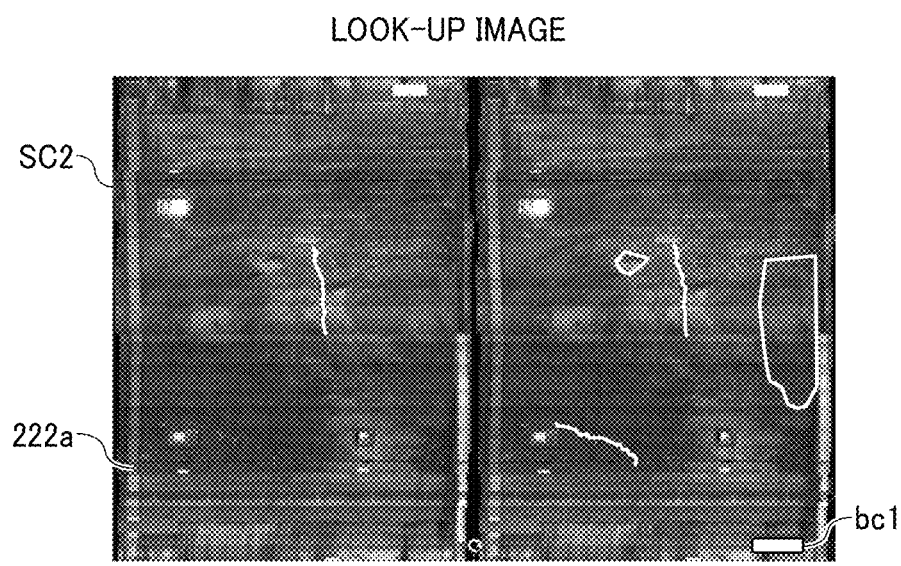
FIG. 35A illustrates an example of the diagnosis target image viewed from the lower direction of the tunnel.
Figure 35B:
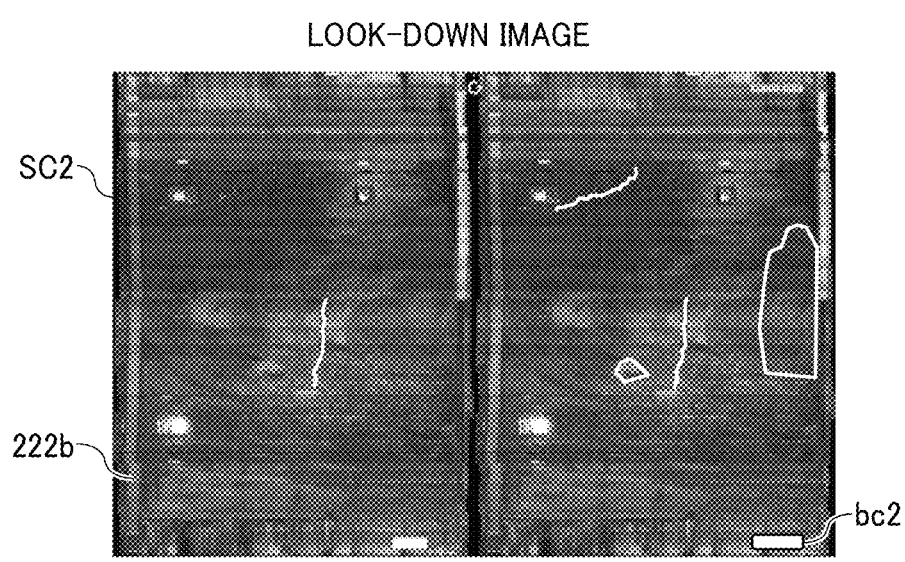
FIG. 35B illustrates an example of the same diagnosis target image viewed from the upper direction of the tunnel.

Hereinafter, a description is given of process of shifting or changing of viewing directions of the development-view image 201 with reference to FIGS. 34A to 34C and 35A to 35B. FIG. 34A illustrates a relationship between the tunnel 8 and the viewing directions, FIG. 34B illustrates a schematic diagram of the tunnel 8 viewed from the lower direction of the tunnel 8, and FIG. 34C illustrates a schematic diagram of the tunnel 8 viewed from the upper direction of the tunnel 8. FIGS. 35A and 35B are examples of diagnosis target images obtained by switching the viewing directions, in which FIG. 35A is an example of the diagnosis target image viewed from the lower direction of the tunnel 8, and FIG. 35B is an example of the same diagnosis target image viewed from the upper direction of the tunnel 8.

The development-view image 201 is an image acquired by looking up the wall and ceiling of the tunnel 8 from the inside of the tunnel 8 as illustrated in FIG. 1. This image is referred to as a "look-up image." However, the observed inspection findings chart to be submitted to the government office might be required to be an image viewed from the outside of the tunnel 8 (i.e., above the tunnel 8) as illustrated in FIG. 9C. This image is referred to as a "look-down image."

As illustrated in FIG. 34A, the tunnel 8 can be viewed from a look-up position of the tunnel 8 such as from an inside 81 of the tunnel 8 and from a look-down position of the tunnel 8 such as from an outside 82 of the tunnel 8, in which the look-up position views the tunnel 8 into a upward direction from the inside 81 of the tunnel 8 and the look-down position views the tunnel 8 into a downward direction from the outside 82 of the tunnel 8. Since the tunnel 8 may be built in undergrounds, such as hills and mountains, the look-down position may be a virtual position in some cases.

As illustrated in FIG. 34A, when the inside 81 of the tunnel 8 is viewed along the viewing direction "sd1," the development-view image becomes the "look-up image" as illustrated in FIG. 34B. In this case, the directions of virtual arrows "va1" and "va2" in FIG. 34A, respectively, become the upward direction at the bottom left, and the downward direction at the upper right in FIG. 34B.

Further, when the same image is viewed from the outside 82 of the tunnel 8 along the viewing direction "sd2," the development-view image becomes the "look-down image" as illustrated in FIG. 34C. In this case, the directions of virtual arrows "va1" and "va2" in FIG. 34A, respectively, become the downward direction at the upper left, and the upward direction at the bottom right in FIG. 34C. That is, the look-up image and the look-down image are the inverted images.

When the display control unit 34 switches or inverts the top and bottom of the development-view image 201 while displaying the development-view image 201 on the display 308, the display control unit 34 displays the diagnosis target element image by changing the y-coordinate the development-view image 201 from "Y" to "−Y" for the two-dimensional coordinates (X, Y) of the diagnosis target element image stored in the storage unit 3000.

When the user presses a "switch to look-down" button "bc1" on the diagnosis position input screen SC2 in FIG. 35A, the reception unit 32 receives the pressing of the "switch to look-down" button "bc1," and then the display control unit 34 switches or converts the image view from the look-up image (FIG. 35A) to the look-down image (FIG. 35B). Further, when the user presses a "switch to look-up" button "bc2" on the diagnosis position input screen SC2 in FIG. 35B, the reception unit 32 receives the pressing of the "switch to look-up" button "bc2", and then the display control unit 34 switches or converts the image view from the look-down image (FIG. 35B) to the look-up image (FIG. 35A). With this configuration, the user can draw the diagnosis target element and the diagnosis region using any one of the look-up image and the look-down image. In this case, the coordinates of positions of the diagnosis target element image and diagnosis region stored in the storage unit 3000 are not changed, but the display control unit 34 changes the display style alone.

As to the above-described embodiment, by using the diagnosis processing terminal 3, the user can draw the diagnosis target image indicating the diagnosis target on the image data (e.g., development view image) of the structural object (e.g., tunnel), and can input the diagnosis information including the diagnosis result of the diagnosis target. As described above, since the user can directly draw the diagnosis target image indicating the diagnosis target identified on the development-view image 201, mistakes or errors that might occur during the document creation process can be reduced compared to the conventional methods of creating the final inspection report including the observed inspection findings chart or the like by comparing and checking a large number of documents and screens using hands and eyes of the user alone.

Further, by associating and storing the coordinates of positions of the diagnosis region and the diagnosis information of the diagnosis region using the diagnosis processing terminal 3, the workload for creating the submission document including the diagnosis information of the structural object, such as the tunnel 8, can be reduced compared to conventional methods.

Further, since the photograph images attached to the photograph ledger use the images corresponding to the diagnosis regions on the development-view image 201, conventional manual work, such as a manual pasting of the observed-inspection findings photograph on the photograph ledger can be omitted, and thereby mistakes of pasting the observed-inspection findings photographs on the photograph ledger at a wrong position can be prevented.

Further, since the partial development-view image 202 can be switched between the look-up image 222a and the look-down image 222b as illustrated in FIGS. 35A and 35B, the drawing of diagnosis target image and the inputting of diagnosis information of diagnosis target image can be performed using the development-view image 201 according to the user's preference of the look-up image 222a and the look-down image 222b, thereby mistakes or errors that might occur during the document creation process can be reduced, in particular, prevented. Further, when submitting the final inspection report to the government office, the diagnosis processing terminal 3 can output the look-down image, required by the government office in some countries, so that the user error in the final inspection report, such as user's misunderstanding of the image direction, can be prevented.

Compared to conventional methods, which is performed mostly using manual works of one or more persons and mostly analog data and information requiring longer time and greater manual workloads and frequently causing mistakes and errors due to the complexity of information handling, by using the diagnosis processing terminal 3 and digitized data and information, as above described in the embodiment, the final inspection report including the diagnosis information of the inspected structural object can be created with less effort and fewer mistakes, and further, the final inspection report can be corrected easily even if the correction of the final inspection report is required after creating the final inspection report. The user can draw the diagnosis target image indicating the diagnosis target on the image of the structural object using the diagnosis processing terminal 3, and can input the diagnosis information including the diagnosis result. Further, by storing the coordinates of the diagnosis region and the diagnosis information of the diagnosis region using the diagnosis processing terminal 3, the final inspection report including the diagnosis information of the inspected structural object can be created with less effort and fewer mistakes compared to conventional methods.

As above described with reference to FIG. 21, the diagnostic information input screen SC3 is displayed on the development-view image 201 of the tunnel 8, but not limited to thereto. For example, as illustrated in FIG. 36, a diagnostic information input screen SC5 can be displayed on the display 308 outside the development-view image 201 of the tunnel 8. Further, the diagnostic information input screen SC5 can be displayed on another display different from the display 308, in which a plurality of displays is used.

In the above described embodiment, the structural object is exemplified as the tunnel, but not limited thereto. For example, the structural object includes piping or tubes used for transporting materials, such as gas, liquid, powder, and granular substance. Further, the structural object can be a vertical hole-shaped reinforced concrete structure, such as a hoistway used as an elevator shaft in which a lift or an elevator travels.

In the above-described embodiments, the size of the diagnosis region "da1" is set greater than the size of the diagnosis target image "dt1," but not limited thereto. For example, the size of the diagnosis region "da1" can be set same as the size of the diagnosis target image "dt1."

Further, in the above-described embodiments, the reception unit 32 receives the drawing of the diagnosis target and the inputting of the diagnosis information of the diagnosis target from the user, but not limited thereto. For example, an artificial intelligence (AI) program executing on the diagnosis processing terminal 3 or the diagnosis management server 5 can search the diagnosis target region on the development-view image 201, automatically select the diagnosis target, and measure the width of the diagnosis target. The selection of the diagnosis target also can be performed by a selection unit implemented by the artificial intelligence program. Further, the measurement of the width of the diagnosis target can be performed by a measurement unit implemented by the artificial intelligence program.

Further, in the above described embodiment, the display control unit 34 displays the diagnosis information input screen SC3 on the development-view image 201, but not limited thereto. For example, the diagnosis information input screen SC3 can be displayed at a part of the periphery of the development-view image 201 if the development-view image 201 can be reduced in size and displayed with the diagnosis information input screen SC3.

Numerous additional modifications and variations are possible in light of the above teachings. It is therefore to be understood that, within the scope of the appended claims, the disclosure of this patent specification can be practiced otherwise than as specifically described herein.

Each of the functions of the above-described embodiments can be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), system on a chip (SOC), graphics processing unit (GPU), and conventional circuit components arranged to perform the recited functions.

What is claimed is:

1. An input apparatus to input a diagnosis result of a diagnosis target detected in a structural object, the input apparatus comprising:
   circuitry configured to
   control a display to display a development-view image of the structural object;
   receive an input, on the development-view image of the structural object displayed on the display, of a drawing of a diagnosis target image that indicates the diagnosis target detected in the structural object; and
   control the display to switch a viewing direction of the development-view image of the structural object between a first viewing direction originating from a look-up position and a second viewing direction originating from a look-down position of the structural object, wherein
   the first viewing direction is an opposite direction as the second viewing direction,
   the look-up position is a position below an inside surface of the structural object, and
   the look-down position is a virtual position outside of and above the structural object.

2. The input apparatus of claim 1, wherein
   the drawing, input to the circuitry, includes a diagnosis target element image that indicates an element configuring the diagnosis target image on the development-view image of the structural object, and
   when the circuitry controls the display to switch the viewing direction of the development-view image of the structural object between the first viewing direction and the second viewing direction, the circuitry is further configured to control the display to display the diagnosis target image configured with the diagnosis target element image on the development-view image by superimposing the diagnosis target image over the development-view image and inverting a color scheme of the diagnosis target image configured with the diagnosis target element.

3. The input apparatus of claim 2, further comprising:
   a memory configured to store two-dimensional position coordinates of "X" and "Y" of the diagnosis target element image in the development-view image, wherein
   when the circuitry controls the display to switch the viewing direction of the development-view image of the structural object between the first viewing direction and the second viewing direction, the circuitry is further configured to control the display to display the diagnosis target element image by changing a position coordinate of "Y" for the two-dimensional position coordinates of the diagnosis target element image stored in the memory to "−Y".

4. The input apparatus of claim 3, wherein
   the circuitry is further configured to
   control the display to display a diagnosis information input screen for receiving a second input of diagnosis information that includes including the diagnosis result of the diagnosis target with the development-view image, and
   receive the second input of the diagnosis information via the diagnosis information input screen, and
   the memory stores the two-dimensional position coordinates of the diagnosis target element image and the diagnosis information in association with each other.

5. The input apparatus of claim 1, wherein the structural object is a tunnel.

6. A diagnosis system, comprising:
   the input apparatus of claim 1; and
   a server that manages the diagnosis information.

7. A method of inputting a diagnosis result of a diagnosis target detected in a structural object, the method comprising:
   controlling a display to display a development-view image of the structural object;
   receiving an input, on the development-view image of the structural object displayed on the display, of a drawing of a diagnosis target image that indicates the diagnosis target detected in the structural object;
   controlling the display to switch a viewing direction of the development-view image of the structural object between a first viewing direction originating from a look-up position and a second viewing direction originating from a look-down position of the structural object, the first viewing direction is an opposite direction as the second viewing direction, the look-up position being a position below an inside surface of the structural object, and the look-down position being a virtual position outside of and above the structural object; and controlling the display to display the diagnosis target image configured with the diagnosis target element image on the development-view image by superimposing the diagnosis target image over the development-view image and inverting a color scheme of the diagnosis target image configured with the diagnosis target element.

8. A non-transitory computer readable storage medium storing one or more instructions that, when executed by one or more processors, cause the one or more processors to execute a method of inputting a diagnosis result of a diagnosis target detected in a structural object, comprising:

controlling a display to display a development-view image of the structural object;

receiving an input, on the development-view image of the structural object displayed on the display, of a drawing of a diagnosis target image that indicates the diagnosis target detected in the structural object;

controlling the display to switch a viewing direction of the development-view image of the structural object between a first viewing direction originating from a look-up position and a second viewing direction originating from a look-down position of the structural object, the first viewing direction is an opposite direction as the second viewing direction, the look-up position being a position below an inside surface of the structural object, and the look-down position being a virtual position outside of and above the structural object; and controlling the display to display the diagnosis target image configured with the diagnosis target element image on the development-view image by superimposing the diagnosis target image over the development-view image and inverting a color scheme of the diagnosis target image configured with the diagnosis target element.

9. The input apparatus of claim 1, wherein the circuitry controls the display to switch the viewing direction in response to a user input indicating to switch the viewing direction.

* * * * *